(12) United States Patent
Shimizu et al.

(10) Patent No.: US 11,250,636 B2
(45) Date of Patent: Feb. 15, 2022

(54) INFORMATION PROCESSING DEVICE, INFORMATION PROCESSING METHOD, AND PROGRAM

(71) Applicant: Sony Corporation, Tokyo (JP)

(72) Inventors: Takayoshi Shimizu, Tokyo (JP); Tsuyoshi Ishikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/254,305

(22) PCT Filed: Jun. 25, 2019

(86) PCT No.: PCT/JP2019/025255
§ 371 (c)(1),
(2) Date: Dec. 21, 2020

(87) PCT Pub. No.: WO2020/017261
PCT Pub. Date: Jan. 23, 2020

(65) Prior Publication Data
US 2021/0217248 A1    Jul. 15, 2021

(30) Foreign Application Priority Data
Jul. 20, 2018 (JP) .............................. JP2018-136547

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01)

(58) Field of Classification Search
CPC ........ G06T 19/006; G06T 19/00; G06T 19/20; G06T 2207/20101; G06T 7/80;
(Continued)

(56) References Cited

U.S. PATENT DOCUMENTS

| 9,754,167 B1 | 9/2017 | Holz |
| 2006/0170652 A1 | 8/2006 | Bannai et al. |

(Continued)

FOREIGN PATENT DOCUMENTS

| JP | 2006-293605 A | 10/2006 |
| JP | 2009-145883 A | 7/2009 |

(Continued)

OTHER PUBLICATIONS

International Search Report and Written Opinion dated Oct. 1, 2019, received for PCT Application No. PCT/JP2019/025255, Filed on Jun. 25, 2019, 11 pages including English Translation.

*Primary Examiner* — Xilin Guo
(74) *Attorney, Agent, or Firm* — Xsensus LLP

(57) ABSTRACT

An information processing device includes: an acquisition unit (110, 140) configured to acquire a captured image including a subject and three-dimensional subject position information indicating a three-dimensional position of the subject; and a content configuration information generation unit (150) configured to generate content configuration information including the captured image, the three-dimensional subject position information, and virtual space association information which is information used for an interaction in which the subject in the captured image displayed in the virtual space is involved and is information for associating the subject in the captured image with the three-dimensional subject position information.

19 Claims, 26 Drawing Sheets

(58) Field of Classification Search
CPC .......... G06F 3/011; G06F 3/01; G06F 3/0484;
G06F 3/04845; G06F 3/04815; G06F
3/0482
See application file for complete search history.

(56) References Cited

U.S. PATENT DOCUMENTS

| | | | |
|---|---|---|---|
| 2016/0033770 A1* | 2/2016 | Fujimaki | H04N 13/344 |
| | | | 345/8 |
| 2017/0364154 A1 | 12/2017 | Levesque et al. | |
| 2018/0012074 A1* | 1/2018 | Holz | G06F 3/011 |
| 2018/0199039 A1* | 7/2018 | Trepte | H04N 19/597 |
| 2018/0225837 A1* | 8/2018 | Liu | G06K 9/00671 |
| 2019/0066385 A1* | 2/2019 | Watanabe | G06F 3/011 |

FOREIGN PATENT DOCUMENTS

| | | |
|---|---|---|
| JP | 2018-14090 A | 1/2018 |
| JP | 2018-112894 A | 7/2018 |
| WO | WO-2017020766 A1 | 2/2017 |

* cited by examiner

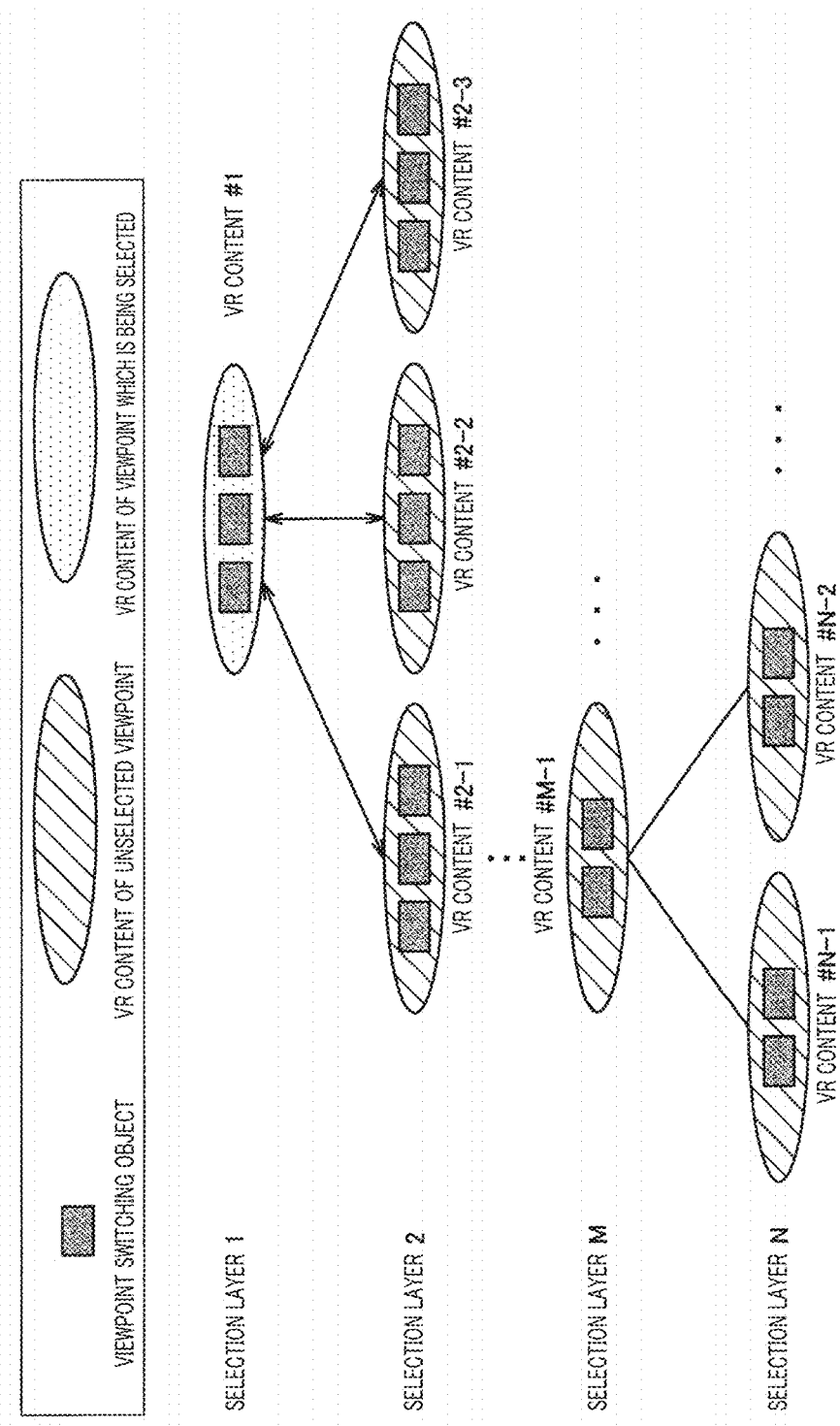

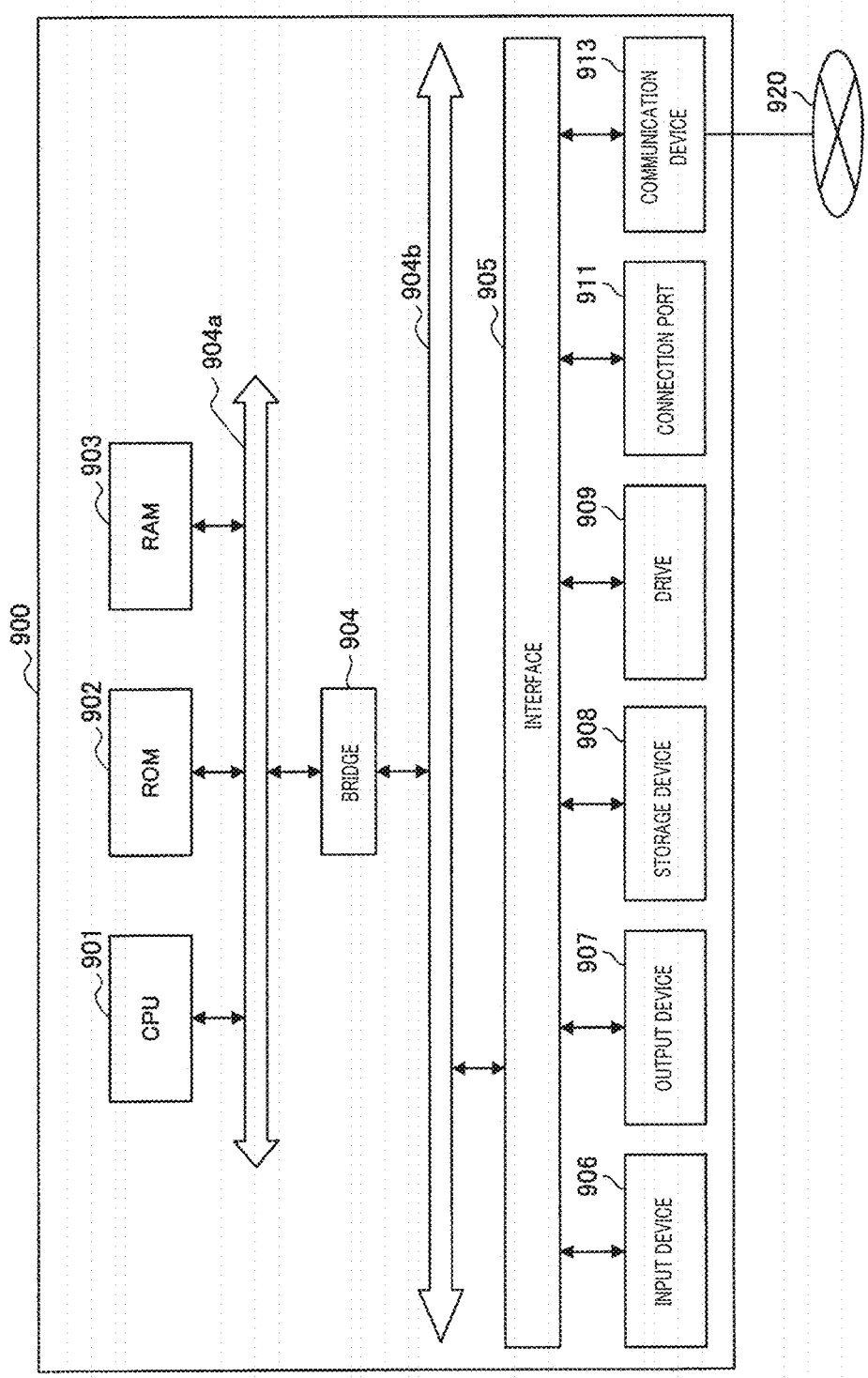

INFORMATION PROCESSING DEVICE, INFORMATION PROCESSING METHOD, AND PROGRAM

CROSS-REFERENCE TO RELATED APPLICATIONS

The present application is based on PCT filing PCT/JP2019/025255, filed Jun. 25, 2019, which claims priority to JP 2018-136547, filed Jul. 20, 2018, the entire contents of each are incorporated herein by reference.

TECHNICAL FIELD

The present disclosure relates to an information processing device, an information processing method, and a program.

BACKGROUND ART

In recent years, VR (virtual reality) technologies have been utilized in various situations. For example, VR technologies have been utilized to support communication between users located in different places.

For example, PTL 1 discloses a technology for displaying a virtual object based on a lecture material on a virtual space in each of devices while delivering the lecture material from a device of a performer to devices of students. The lecture material includes a material input by video input means included in the device of the performer and cited in real time or generated by improvisation.

CITATION LIST

Patent Literature

[PTL 1]
JP 2009-145883 A

SUMMARY

Technical Problem

The lecture material in PTL 1 is an example of photographic VR content. The photographic VR content is VR content in which a captured image obtained by imaging the real space is disposed in a virtual space. For example, in a photographic VR content in which a celestial sphere image (an omnidirectional 360-degree panoramic image of) of the real space is disposed in a virtual space, a user can feel a sensation of being in the real space.

Since 2-dimensional captured images are typically included in live VR content, it is difficult to realize a three-dimensional spatial interaction such as touching. Therefore, for example, even when a user touches an object in photographic VR content, the tactile sensation is not fed back to the user. Thus, an interaction implemented in a photographic VR content is unnatural and different from an interaction in the real space.

Accordingly, the present disclosure proposes a structure capable of realizing a spatial interaction in photographic VR content more appropriately.

Solution to Problem

According to the present disclosure, there is provided an information processing device including: an acquisition unit configured to acquire a captured image including a subject and three-dimensional subject position information indicating a three-dimensional position of the subject; and a content configuration information generation unit configured to generate content configuration information including the captured image, the three-dimensional subject position information, and virtual space association information which is information used for an interaction in which the subject in the captured image displayed in the virtual space is involved and is information for associating the subject in the captured image with the three-dimensional subject position information.

According to the present disclosure, there is provided an information processing device including: an acquisition unit configured to acquire content configuration information including a captured image including a subject, three-dimensional subject position information indicating a three-dimensional position of the subject, and virtual space association information which is information used for an interaction in which the subject in the captured image displayed in the virtual space is involved and is information for associating the subject in the captured image with the three-dimensional subject position information; and an output control unit configured to display the captured image in the virtual space based on the content configuration information and control a feedback output corresponding to an interaction in which the subject in the captured image displayed in the virtual space is involved.

According to the present disclosure, there is provided an information processing method performed by a processor. The method includes: acquiring a captured image including a subject and three-dimensional subject position information indicating a three-dimensional position of the subject; and generating content configuration information including the captured image, the three-dimensional subject position information, and virtual space association information which is information used for an interaction in which the subject in the captured image displayed in the virtual space is involved and is information for associating the subject in the captured image with the three-dimensional subject position information.

According to the present disclosure, there is provided an information processing method performed by a processor. The method includes: acquiring content configuration information including a captured image including a subject, three-dimensional subject position information indicating a three-dimensional position of the subject, and virtual space association information which is information used for an interaction in which the subject in the captured image displayed in the virtual space is involved and is information for associating the subject in the captured image with the three-dimensional subject position information; and displaying the captured image in the virtual space based on the content configuration information and controlling a feedback output corresponding to an interaction in which the subject in the captured image displayed in the virtual space is involved.

According to the present disclosure, there is provided a program causing a computer to function as: an acquisition unit configured to acquire a captured image including a subject and three-dimensional subject position information indicating a three-dimensional position of the subject; and a content configuration information generation unit configured to generate content configuration information including the captured image, the three-dimensional subject position information, and virtual space association information which is information used for an interaction in which the subject in the captured image displayed in the virtual space is involved and is information for associating the subject in the captured image with the three-dimensional subject position information.

According to the present disclosure, there is provided a program causing a computer to function as: an acquisition unit configured to acquire content configuration information including a captured image including a subject, three-dimensional subject position information indicating a three-dimensional position of the subject, and virtual space association information which is information used for an interaction in which the subject in the captured image displayed in the virtual space is involved and is information for associating the subject in the captured image with the three-dimensional subject position information; and an output control unit configured to display the captured image in the virtual space based on the content configuration information and control a feedback output corresponding to an interaction in which the subject in the captured image displayed in the virtual space is involved.

Advantageous Effects of Invention

According to the present disclosure, as described above, it is possible to provide a structure capable of realizing a spatial interaction in photographic VR content more appropriately. The foregoing advantageous effects are not necessarily restrictive and any advantageous effect described in the present specification or other advantageous effects ascertained in the present specification can be obtained in addition to the foregoing advantageous effects or instead of the foregoing advantageous effects.

BRIEF DESCRIPTION OF DRAWINGS

FIG. 11 is a diagram illustrating viewpoint switching based on a viewpoint switching object according to the first embodiment.

FIG. 25 is a block diagram illustrating an example of a hardware configuration of an information processing device according to an embodiment.

DESCRIPTION OF EMBODIMENTS

Figure 1:
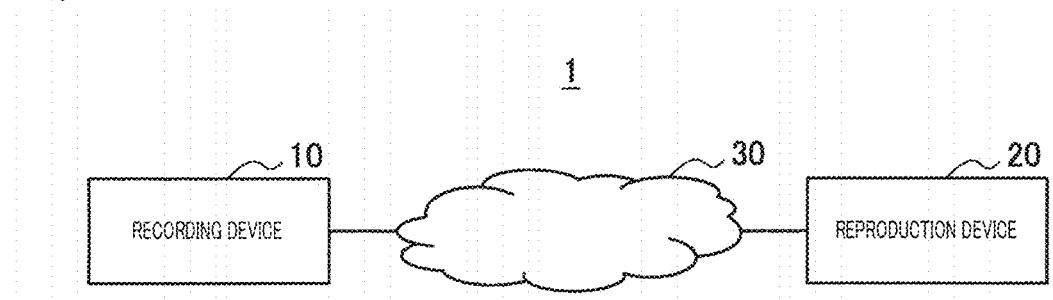
FIG. 1 is a diagram illustrating an example of a configuration of a content delivery system according to an embodiment of the present disclosure.

Hereinafter, preferred embodiments of the present disclosure will be described in detail with reference to the appended figures. In the present specification and the figures, the same reference numerals are given to constituent elements that have substantially the same functional configurations and repeated description thereof will be omitted.

The description will be made in the following order.
1. System configuration example
2. First embodiment
2.1. Overview
2.2. Technical features of recording device
2.2.1. Functional configuration example of recording device
2.2.2. Format of content configuration information
2.2.3. Flow of recording process
2.3. Technical features of reproduction device
2.3.1. Functional configuration example of reproduction device
2.3.2. Spatial interaction
2.3.3. Viewpoint switching
3. Second embodiment
3.1. Overview 3.2. Technical features of recording device
3.2.1. Functional configuration example of recording device
3.2.2. Format of content configuration information
3.2.3. Flow of recording process
3.3. Technical features of reproduction device
3.3.1. Functional configuration example of reproduction device
3.3.2. Spatial interaction
4. Supplement
5. Hardware configuration example
6. Conclusion 1. System Configuration Example FIG. 1 is a diagram illustrating an example of a configuration of a content delivery system 1 according to an embodiment of the present disclosure. As illustrated in FIG. 1, the content delivery system 1 includes a recording device 10 and a reproduction device 20. The recording device 10 and the reproduction device 20 are connected via a network 30.

The recording device 10 is an information processing device that acquires and records information for VR content that is reproduced by the reproduction device 20 and transmits the information to the reproduction device 20. For example, the recording device 10 transmits a captured image (a moving image/a still image) obtained by imaging a real space and depth information of the real space to the reproduction device 20. The recording device 10 may omit the recording and transmit the acquired information in real time.

A moving image is data that includes a plurality of still images (image data) and reproduction times of the respective still images. When the moving image is reproduced, the still images are continuously reproduced in the order of the reproduction times. The still images included in the moving image are also referred to as frames. A display speed of the moving image is also referred to as a frame rate and is expressed as the number of frames displayed per second (FPS: Frame Per Second). The moving image may include sound data that is reproduced with the reproduction of the image data.

The captured image transmitted from the recording device 10 to the reproduction device 20 is assumed to be a moving image.

The reproduction device 20 is an information processing device that controls reproduction of VR content based on the information received from the recording device 10. For example, the reproduction device 20 generates VR content based on the information received from the recording device 10, and causes the VR content to be output virtually and causes an output device to output a feedback corresponding to a user operation on the VR content.

The VR content is content in which various virtual objects are disposed in a virtual space. A virtual object is a virtual object disposed in a virtual space. An element used to determine whether virtual objects collide with each other is assigned to the virtual objects. The element is also referred to as a collider in some cases. The collider is disposed to overlap a virtual object. Whether virtual objects collide with each other is determined by determining whether colliders collide with each other. The virtual objects are displayed, but the colliders are typically not displayed (that is, invisible). This is because the colliders are elements used to determine a collision. Of course, the colliders may be set to be displayed. In this case, the colliders are displayed.

The network 30 is a wired or wireless transmission path of information transmitted from a device connected to the network 30. The network 30 is realized by, for example, the Internet, a local area network (LAN), a wireless LAN, or a cellular communication network.

2. First Embodiment

A first embodiment is a mode in which a three-dimensional spatial interaction between the surface of a real object in a virtual space and a virtual object is realized by associating the real object in a captured image disposed in the virtual space with three-dimensional position information of the surface of the real object.

<2.1. Overview>

(1) Overview of Recording Device

Figure 2:
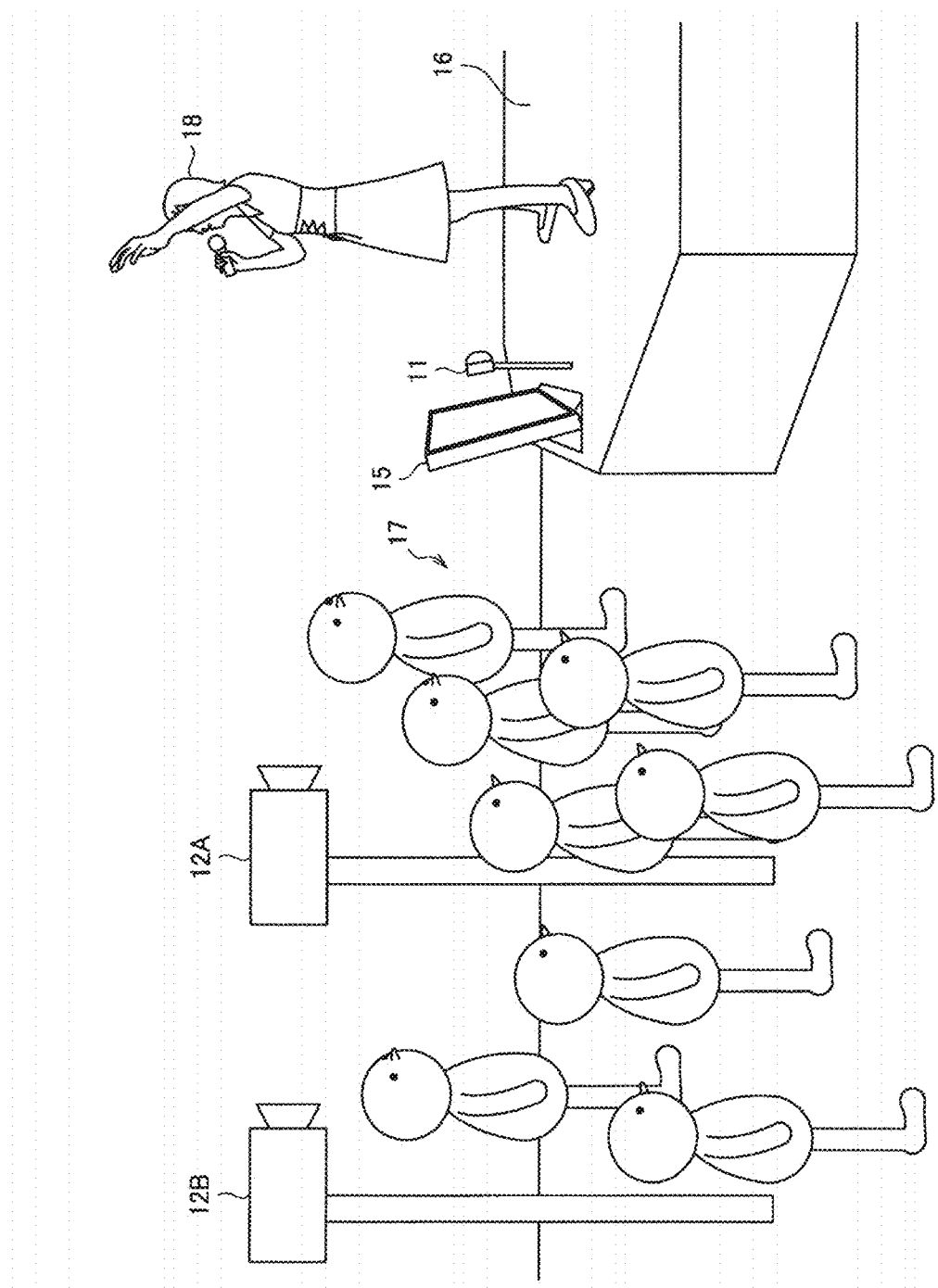
FIG. 2 is a diagram illustrating an overview of a recording device according to a first embodiment.

FIG. 2 is a diagram illustrating an overview of the recording device of the recording device 10 according to the embodiment. FIG. 2 illustrates an example of a space which is an information recording target of the recording device 10. As illustrated in FIG. 2, a performer 18 performs on a stage 16 in front of many spectators in a spectator stand 17 in the present space. In the present space, a first sensor device 11 and second sensor devices 12 (12A and 12B) are installed as devices involved in recording by the recording device 10. In the present space, a monitor 15 is also disposed.

First Sensor Device 11

The first sensor device 11 is a device that senses the real space including a real object which is a spatial interaction target in VR content. The real object is an object which is in the real space. The first sensor device 11 includes an imaging device and a depth sensor. The imaging device is a device that images a real object (that is, a subject) in the real space and acquires a captured image. The imaging device is realized by, for example, a monocular camera, a stereo camera, an infrared camera, or the like. An image to be captured is a 2-dimensional image, a celestial sphere (360 degrees) image, a half celestial sphere (180 degrees) image, or an image with any other imaging range. Hereinafter, it is assumed that the imaging device is realized by a stereo camera and a stereo celestial sphere image which can be viewed stereoscopically is captured. Hereinafter, the imaging device is also referred to as a VR camera. The depth sensor is a device that detects depth information of a real object in the real space. The depth information is a measured value of an optical axis direction (depth) of a sensor. For example, a sensor of any type of scheme such as light coding, time of flight, or infrared depth can be adopted as the depth sensor.

The first sensor device 11 is installed, for example, in the middle of the monitor 15 and senses the stage 16 including the performer 18 at a relatively short distance. The stage 16 and the performer 18 are real objects which are spatial interaction targets in VR content.

Second Sensor Devices 12

The second sensor device 12 is a device that senses the real space. The second sensor device 12 includes an imaging device. The imaging device has been described above with regard to the first sensor device 11. The second sensor devices 12 are installed in the spectator stand and sense the stage 16 including the performer 18 from a relatively long distance.

Monitor 15

The monitor 15 is a display device that displays a form of a user provided with VR content by the reproduction device 20. Therefore, the performer 18 can perform while viewing spectators actually in front of him or her and spectators watching the performer over the network 30.

The devices installed in the recording target space have been described above.

The recording device 10 generates content configuration information including various kinds of information for configuring VR content on the side of the reproduction device 20 based on sensing results from the first sensor device 11 and the second sensor devices 12. Then, the recording device 10 transmits the generated content configuration information to the reproduction device 20.

The sensing result from the first sensor device 11 is used to generate VR content on which a spatial interaction to be described below is possible and to perform viewpoint switching to be described below. The sensing results by the second sensor devices 12 are used to perform viewpoint switching to be described below.

(2) Overview of Reproduction Device

Figure 3:
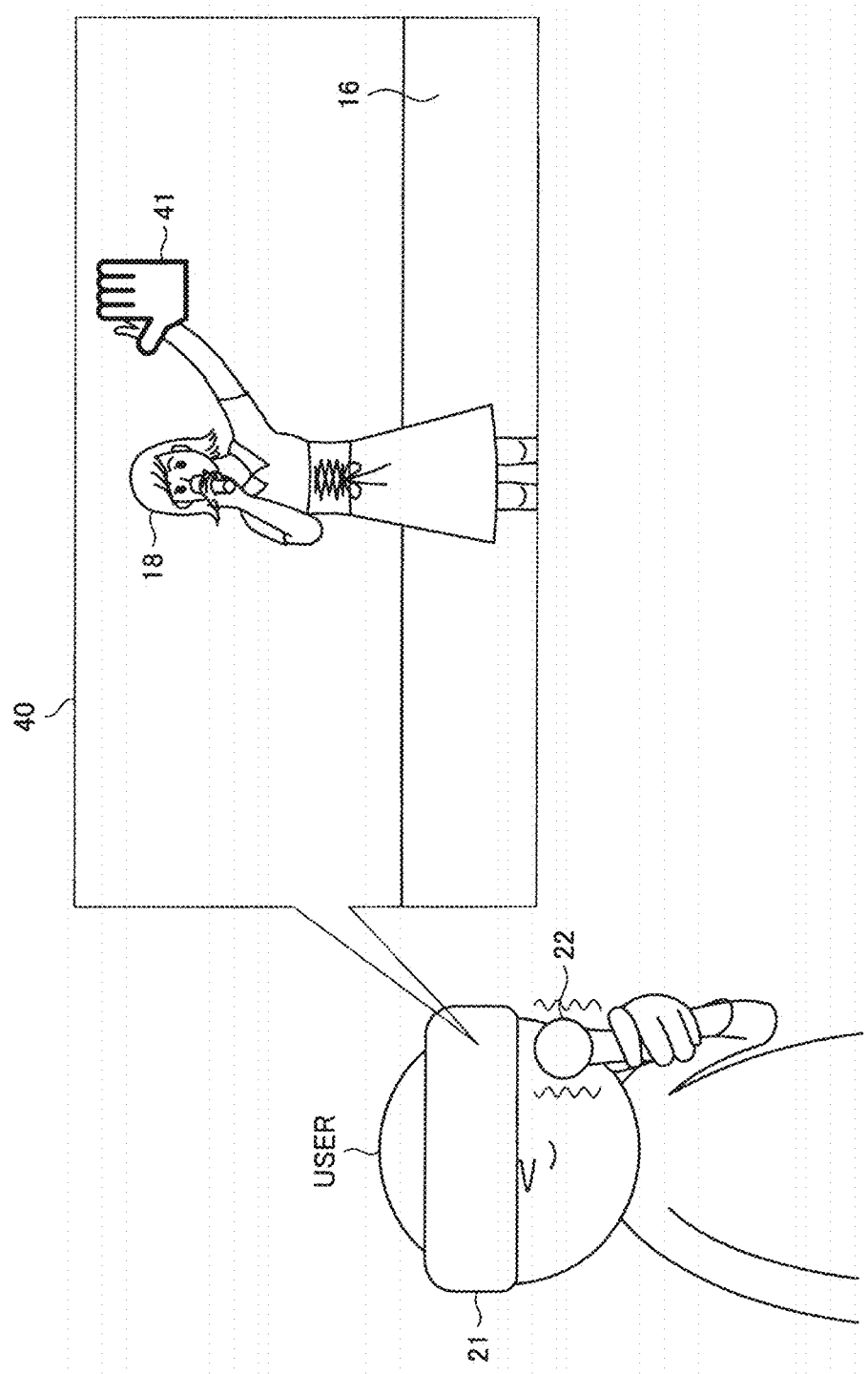
FIG. 3 is a diagram illustrating an overview of a reproduction device according to the first embodiment.

FIG. 3 is a diagram illustrating an overview of the reproduction device 20 according to the embodiment. FIG. 3 illustrates a head-mounted display (HMD) 21 and a controller 22 as devices involved in reproduction of VR content by the reproduction device 20.

The HMD 21 is an output device that outputs the VR content. The HMD 21 is mounted on the head of a user so that a display unit capable of displaying an image is located in front of the eyes of the user. The HMD 21 rotates or zooms the VR content with movement of the head of the user while displaying the VR content. The HMD 21 outputs a visual/auditory/olfactory feedback corresponding to a user operation on the VR content. The output device may be realized by, for example, a smartphone, a tablet terminal, or the like in addition to the HMD 21.

The controller 22 is an input/output device that outputs a tactile feedback corresponding to a user operation while receiving the user operation on the VR content. In the example illustrated in FIG. 3, the controller 22 is a stick type device and is grasped and operated by the user. The controller 22 can also be realized in, for example, any form such as a glove type in addition to a stick type. The VR content is operated based on a position and an attitude of the controller 22. As the tactile feedback which can be output, for example, a vibration, an electric stimulus, or a force sense can be exemplified. Hereinafter, the tactile feedback is assumed to be realized as a vibration.

In the present specification, the position is assumed to be three-dimensional unless mentioned otherwise. The attitude is assumed to be an attitude of six degrees of freedom (6DoF) unless mentioned otherwise.

The devices involved in the reproduction of the VR content by the reproduction device 20 have been described above.

The reproduction device 20 generates VR content based on the content configuration information received from the recording device 10. Here, the first sensor device 11 and the second sensor devices 12 illustrated in FIG. 2 correspond to viewpoints in a recording target space. A user can freely select a viewpoint in the recording target space and can be supplied with the VR content in which the recording target space is able to be viewed from any viewpoint. A viewpoint can be switched by switching the VR content to be reproduced. Specifically, the switching of the viewpoint is realized by switching the sensor device (the first sensor device 11 or the second sensor device 12) that generates the content configuration information which is an origin of the VR content to be reproduced based on the sensing result of the sensor device.

In the VR content according to the embodiment, a captured image obtained by imaging the real space is disposed and displayed in the virtual space as one of the virtual objects. Further, in the VR content according to the embodiment, three-dimensional position information indicating a three-dimensional position of a real object is associated with the real object in the captured image disposed in the virtual space. Thus, it is possible to realize a spatial interaction in which the real object included in the captured image disposed in the virtual space is involved. Hereinafter, this point will be described in detail.

As illustrated in FIG. 3, the HMD 21 displays VR content 40 generated by the reproduction device 20. In the VR content 40, a captured image including the performer 18 on the stage 16 illustrated in FIG. 2 is disposed and displayed in the virtual space and three-dimensional position information is associated with each of the stage 16 and the performer 18 in the captured image.

When the user operates the controller 22, a position and an attitude of an operator 41 are changed in the virtual space in accordance with a position and an attitude of the controller 22 in the real space. The operator 41 is a virtual object indicating an operation position of the user in the virtual space. The reproduction device 20 determines a collision between the operator 41 and the stage 16 or the performer 18 in the virtual space based on a position of the operator 41 in the virtual space and the three-dimensional position information associated with the stage 16 or the performer 18. Then, when it is determined that the operator 41 collides with the stage 16 or the performer 18, the reproduction device 20 causes the HMD 21 to output a visual/auditory/olfactory feedback corresponding to the collision and causes the controller 22 to output a tactile feedback corresponding to the collision.

In this way, the content delivery system 1 according to the embodiment can realize the spatial interaction in which the real object in the captured image disposed in the virtual space is involved.

<2.2. Technical Features of Recording Device>

<2.2.1. Functional Configuration Example of Recording Device>

Figure 4:
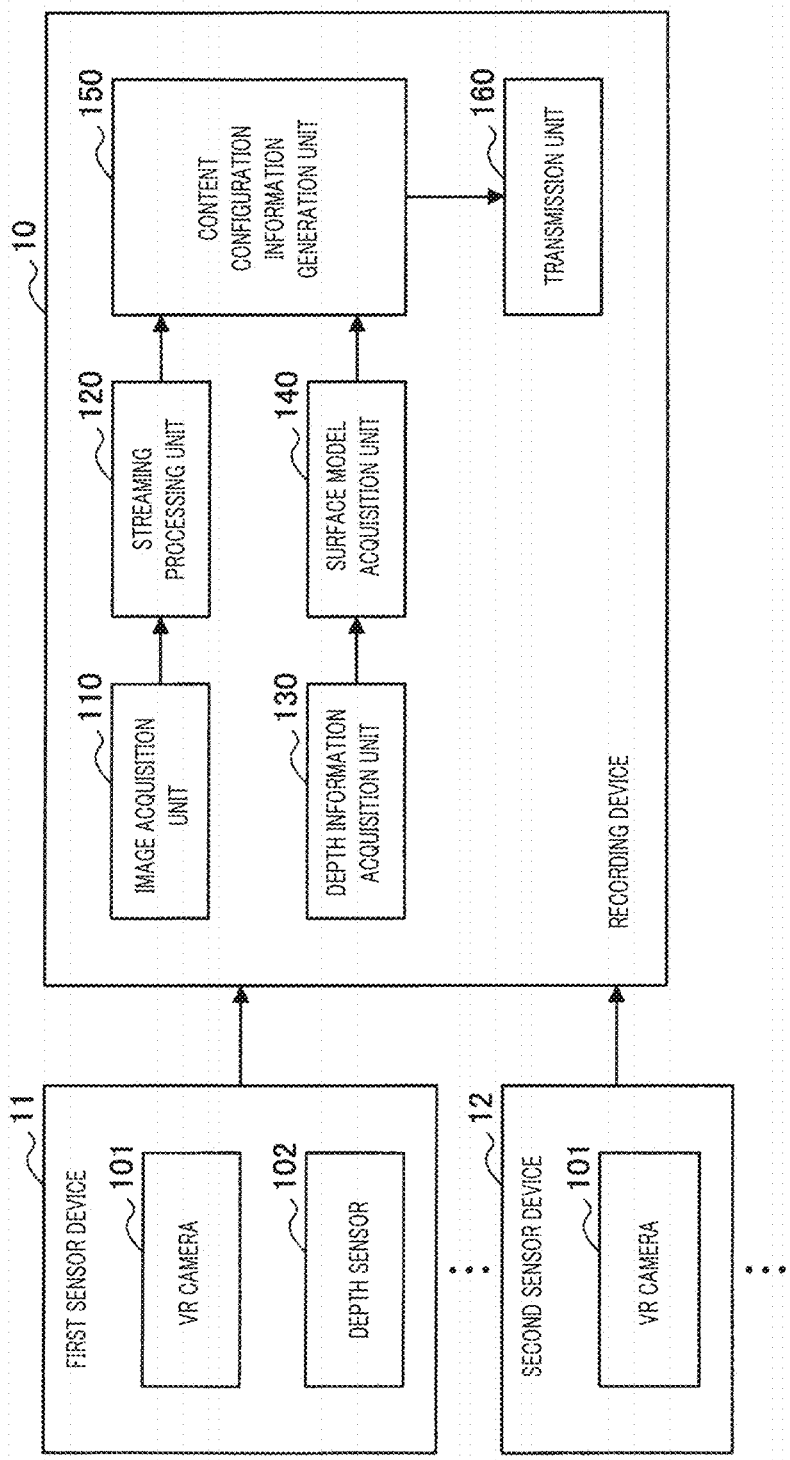
FIG. 4 is a block diagram illustrating an example of a functional configuration of the recording device according to the first embodiment.

FIG. 4 is a block diagram illustrating an example of a functional configuration of the recording device 10 according to the embodiment. As illustrated in FIG. 4, the recording device 10 includes an image acquisition unit 110, a streaming processing unit 120, a depth information acquisition unit 130, a surface model acquisition unit 140, a content configuration information generation unit 150, and a transmission unit 160.

FIG. 4 also illustrates an example of functional configurations of the first sensor device 11 and the second sensor devices 12. As illustrated in FIG. 4, the first sensor device 11 includes a VR camera 101 and a depth sensor 102 and the second sensor device 12 includes a VR camera 101. The recording device 10 can be connected to one or more first sensor devices 11 and one or more second sensor devices 12.

Hereinafter, the functional configurations will be described.

(1) First Sensor Device 11

The VR camera 101 and the depth sensor 102 have been described above with reference to FIG. 2, and therefore description thereof will be omitted.

(2) Second Sensor Device 12

The VR camera 101 has been described above with reference to FIG. 2, and therefore description thereof will be omitted.

(3) Recording Device 10

(Image Acquisition Unit 110)

The image acquisition unit 110 has a function of acquiring a captured image including a real object in the real space from the VR camera 101 included in the first sensor device 11 or the second sensor device 12. Here, the acquisition of the captured image is reception of data of the captured image, reading of captured image data recorded on a predetermined recording medium such as a memory, or the like. When the VR camera 101 is a stereo camera, the image acquisition unit 110 acquires a stereo image (a stereo celestial sphere image) formed by two of left and right captured images (an L image which is a left captured image and an R image which is a right captured image) as a captured image. The image acquisition unit 110 outputs the acquired captured image to the streaming processing unit 120.

(Streaming Processing Unit 120)

The streaming processing unit 120 has a function of performing a streaming process for the captured image acquired by the image acquisition unit 110. For example, the streaming processing unit 120 outputs the captured image to the content configuration information generation unit 150 in an order of an imaging time.

(Depth Information Acquisition Unit 130)

The depth information acquisition unit 130 has a function of acquiring depth information of the real object in the real space from the depth sensor 102 included in the first sensor device 11. Here, the depth information is, for example, a depth image. The depth information acquisition unit 130 outputs the acquired depth information to the surface model acquisition unit 140.

(Surface Model Acquisition Unit 140)

The surface model acquisition unit 140 has a function of acquiring a surface model of the real object based on the depth information acquired by the depth information acquisition unit 130. The surface model of the real object is three-dimensional model data including information regarding a point group that includes a plurality of points which are points on the surface of the real object and are points with which the three-dimensional position information is associated. Here, the three-dimensional position information is information which is defined by the origin set based on the position of the depth sensor 102 and coordinate axes set based on the attitude of the depth sensor 102 and indicates a position of the depth sensor 102 in a coordinate system. The surface model can also be regarded as three-dimensional position information (corresponding to three-dimensional subject position information) of the point group on the surface of the real object. Here, the point group is, for example, a pixel group that includes a plurality of pixels in the depth image acquired by the depth information acquisition unit 130. Any resolution of the point group is set. The resolution of the point group corresponding to the real object may be lower than the resolution of the real object in the captured image. In this case, compared to a case in which all the captured images are configured by the point group (that is, the captured images are expressed as a point cloud), it is possible to reduce a transmission data amount and increase the resolution of the real object which is viewed by the user. Of course, in the present technology, the captured images may be expressed as a point cloud.

The surface model may be three-dimensional position information of a point group of a real object satisfying a predetermined condition on the surface. The real objects satisfying the predetermined condition are, for example, a real object involved in a spatial interaction in the VR content and are the stage 16 and the performer 18 in the example illustrated in FIG. 2. In this case, the predetermined condition is a condition that a real object is involved in the spatial interaction, specifically, a condition that the real object is a moving body, has a surface with a size exceeding a predetermined threshold, or is a foreground. For example, the surface model acquisition unit 140 specifies a real object satisfying the predetermined condition by applying image recognition or the like to a depth image. The surface model acquisition unit 140 acquires a surface model formed from three-dimensional position information of a point group on the surface of the real object satisfying the predetermined condition by extracting the point group on the surface of the real object satisfying the predetermined condition from the depth image and deleting the others. Thus, of the number of points that form the surface model, only points corresponding to the real object involved in the spatial interaction can be deleted. Therefore, it is possible to prevent delay of transmission of the content configuration information from the recording device 10 to the reproduction device 20.

The surface model acquisition unit 140 may also be used to detect a region in which an interaction of a hand or the like of the performer 18 is assumed to arise through an image recognition process in advance and reduce transmission delay. For example, the surface model acquisition unit 140 may generate the surface model by setting only a region in which an interaction is assumed to arise and record the surface model in the content configuration information.

The surface model acquisition unit 140 may be used to detect a region, such as a predetermined part of the body of the performer 18 other than hands, in which an interaction is to be prevented from arising in advance through an image recognition process, and to reduce a delay of transmission. For example, the surface model acquisition unit 140 may forbid recording of surface model information of the part in the content configuration information by excluding a region in which an interaction is to be prevented from arising the surface model generation target.

The surface model may be three-dimensional position information of the number of points in accordance with a transmission speed of the content configuration information. In this case, the surface model acquisition unit 140 performs decimation until the granularity of the point group forming a surface model becomes predetermined granularity in accordance with the transmission speed. For example, the surface model acquisition unit 140 decimates a large number of points from the point group when the transmission speed is slow, and decimates a small number of points from the point group when the transmission speed is fast. Thus, it is possible to prevent delay of transmission of the content configuration information from the recording device 10 to the reproduction device 20 without an excess or deficiency.

The surface model acquisition unit 140 may remove noise of the point group. Here, the noise is points which are considerably away from, for example, the other points. By reducing the number of points included in the point group, it is possible to reduce delay of transmission from the recording device 10 to the reproduction device 20. In this way, the surface model of the real object is generated.

(Content Configuration Information Generation Unit 150)

The content configuration information generation unit 150 has a function of generating the content configuration information based on outputs from the streaming processing unit 120 and the surface model acquisition unit 140. The content configuration information generation unit 150 outputs the generated content configuration information to the transmission unit 160.

The content configuration information is information that includes various kinds of information for configuring VR content on the side of the reproduction device 20. The content configuration information generation unit 150 generates the content configuration information by containerizing a captured image, a surface model, and various kinds of information for configuring the VR content on the side of the reproduction device 20 based on the information. The content configuration information includes the captured image, the surface model, and virtual space association information for associating a real object in the captured image and the surface model. The virtual space association information is information used for an interaction in which a real object in a captured image displayed in a virtual space is involved. A format of the content configuration information will be described below.

The content configuration information generation unit 150 generates the content configuration information corresponding to the viewpoint selected on the side of the reproduction device 20. Specifically, the content configuration information generation unit 150 generates the content configuration information based on a sensing result from the sensor device (the first sensor device 11 or the second sensor device 12) corresponding to a viewpoint selected on the side of the reproduction device 20.

(Transmission Unit 160)

The transmission unit 160 has a function of transmitting information to other devices. Specifically, the transmission unit 160 transmits the content configuration information generated by the content configuration information generation unit 150 to the reproduction device 20.

<2.2.2. Format of Content Configuration Information>

Figure 5:
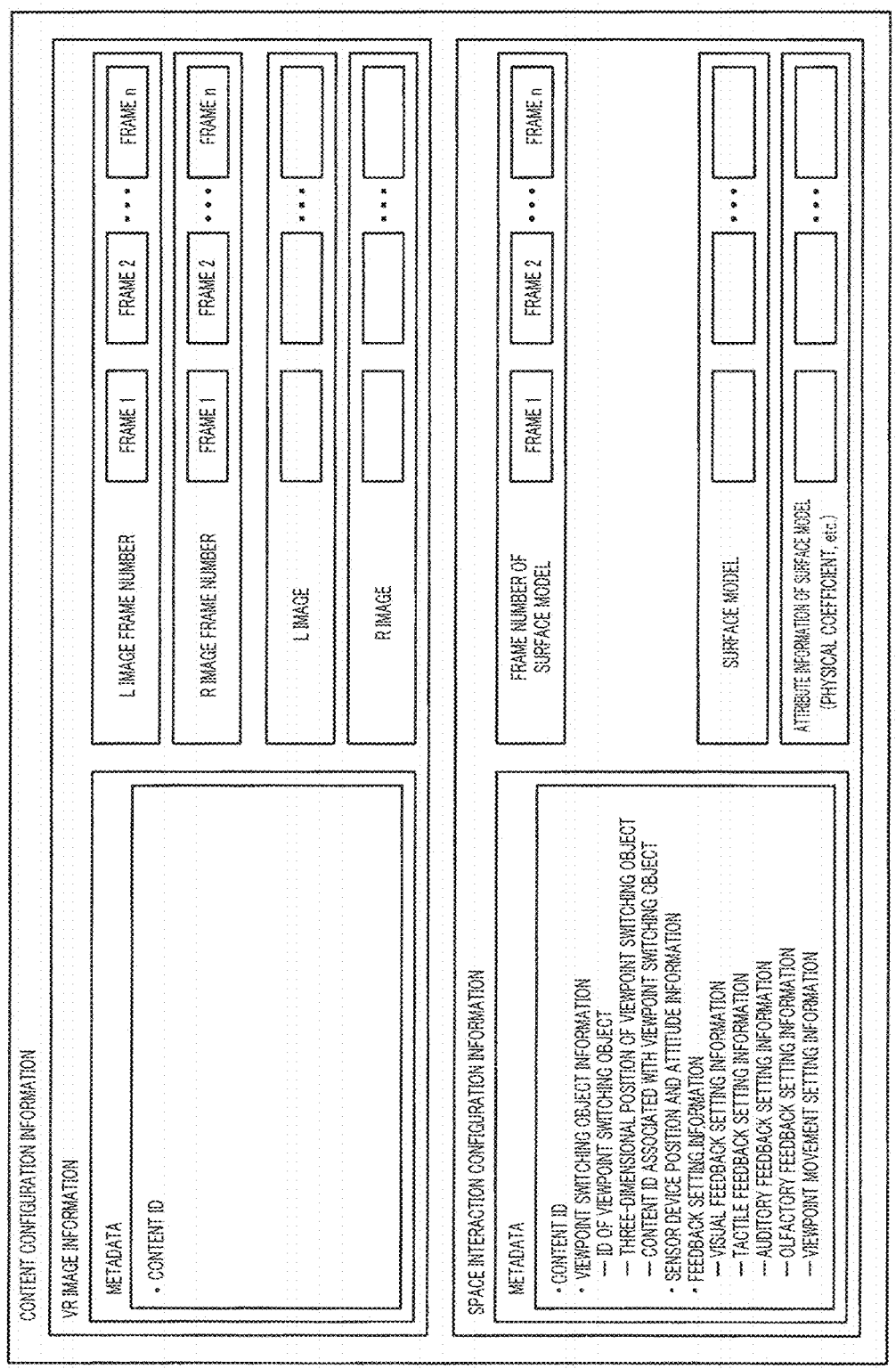
FIG. 5 is a diagram illustrating an example of a format of content configuration information according to the first embodiment.

FIG. 5 is a diagram illustrating an example of a format of the content configuration information according to the embodiment. As illustrated in FIG. 5, the content configuration information includes VR image information and spatial interaction configuration information. FIG. 5 illustrates a format of the content configuration information in which a surface model and images of frames with frame numbers 1 to n are containerized. Hereinafter, the format will be described in detail.

VR Image Information

The VR image information includes images output from the streaming processing unit 120 and information related to the images.

The VR image information includes an L image (a left image of a stereo image) and a frame number of each frame, and an R image (a right image of the stereo image) and a frame number of each frame. The frame number is information corresponding to an imaging time of the image and corresponds to virtual space association information.

The VR image information includes metadata of the image. The metadata includes a content ID. The content ID is identification information of the VR content. The content ID may also be regarded as information indicating a viewpoint in a recording target space. In other words, the content ID may also be information indicating which sensor device (the VR camera 101) captures the captured image, that is, identification information of the sensor device capturing the captured image. The content ID is identification information associating the captured image with the surface model and corresponds to virtual space association information.

Spatial Interaction Configuration Information

The spatial interaction configuration information includes a surface model of each frame, attribute information of the surface model, and a frame number. The surface model of each frame is a surface model of the real object included in the image of each frame. That is, the spatial interaction configuration information includes three-dimensional position information of a plurality of points on the surface of the real object included in the image of each frame. The attribute information is information indicating a physical coefficient of the real object included in the image of each frame, such as a reflection coefficient, a frictional coefficient, or a normal direction. The attribute information can be set for each point included in the surface model. The frame number is information corresponding to a detection time of the surface model (that is, a detection time of depth information) and corresponds to the virtual space association information. The frame number of the captured image captured at a certain time preferably matches the frame number of the surface model detected at the same time. Thus, it is easy to establish chronological synchronization between the captured image and the surface model (hereinafter also referred to as timing synchronization).

The spatial interaction configuration information includes metadata. The metadata includes a content ID, viewpoint switching object information, sensor device position and attitude information, and feedback setting information.

The content ID is identification information of the VR content. The content ID may also be regarded as information indicating a viewpoint in the recording target space. In other words, the content ID may be information indicating whether the surface model is generated based on the depth information detected by the sensor device (the depth sensor 102), that is, identification information of the sensor device that detects the depth information. The content ID is identification information associating the captured image with the surface model and corresponds to virtual space association information.

The viewpoint switching object information is information regarding a viewpoint switching object and is used to switch a viewpoint. The viewpoint switching object is a virtual object with which a collider for switching a viewpoint is associated. The viewpoint switching object information includes an ID of the viewpoint switching object, three-dimensional position information of the viewpoint switching object, and a content ID associated with the viewpoint switching object. The content ID is a content ID of VR content of a switching destination when the viewpoint is switched based on the viewpoint switching object.

The sensor device position and attitude information is information regarding a coordinate system of the imaging device capturing the captured image and a coordinate system of the sensor detecting the surface model (that is, depth information) and corresponds to the virtual space association information. That is, the sensor device position and attitude information according to the embodiment is information regarding a coordinate system of the VR camera 101 and a coordinate system of the depth sensor 102. The coordinate system of the VR camera 101 is defined by the origin set based on a position of the VR camera 101 and coordinate axes set based on an attitude of the VR camera 101. The coordinate system of the depth sensor 102 is defined by the origin set based on a position of the depth sensor 102 and coordinate axes set based on an attitude of the depth sensor 102.

The sensor device position and attitude information may include information indicating the positions and attitudes of the VR camera 101 and the depth sensor 102, which is information for defining the coordinate systems. The sensor device position and attitude information may include information indicating a deviation between the coordinate systems, such as differences between the positions and attitudes of the VR camera 101 and the depth sensor 102. The sensor device position and attitude information may be set manually based on, for example, installation situations of the VR camera 101 and the depth sensor 102. The sensor device position and attitude information may be acquired by comparing the position and attitude of a recognition target in the captured image with the position and attitude of the recognition target in the depth image when the recognition target is imaged by the VR camera 101 and is sensed by the depth sensor 102. As the recognition target, a panel or a cubic mechanism to which a predetermined checker pattern is affixed can be exemplified.

Even in the VR camera 101 and the depth sensor 102 included in the same first sensor device 11, the positions and the attitudes can also deviate. The deviation can result in a deviation between a real object in the captured image disposed in the virtual space and the surface model associated with the real object at the time of configuration of the VR content on the side of the reproduction device 20. From this point, by including the sensor device position and attitude information in the content configuration information, it is possible to correct the deviation on the side of the reproduction device 20.

The feedback setting information is information for setting feedback content when an interaction in which the real object in the captured image displayed in the virtual space is involved is performed. The feedback setting information includes information for setting content fed back visually, tactually, auditorily, or olfactorily. Specifically, the feedback setting information can include visual feedback setting information in which content fed back visually is set. The visual feedback setting information includes, for example, information indicating an icon that represents a collision to be displayed at the time of collision. The feedback setting information includes tactile feedback setting information in which content fed back tactually is set. The tactile feedback setting information can include, for example, information indicating a frequency, an amplitude, and a vibration time of vibration to be output at the time of collision. The feedback setting information can include auditory feedback setting information in which content fed back auditorily is set. The auditory feedback setting information includes, for example, information indicating a sound to be output at the time of collision. The feedback setting information can include olfactory feedback setting information in which content fed back olfactorily is set. The olfactory feedback setting information includes, for example, information indicating a scent such as an explosive or a perfume to be output at the time of collision. The feedback setting information includes viewpoint movement setting information in which content fed back at the time of viewpoint movement in the virtual space is set. The viewpoint movement setting information includes, for example, information for designating a viewpoint switching position and information for designating a rotation amount of a visual field after the viewpoint movement. By including the feedback setting information in the content configuration information, it is possible to provide a user with a feedback intended by a producer of the VR content.

Here, when a plurality of real objects involved in a spatial interaction is included in the captured image, the spatial interaction configuration information may also include a set of a surface model, attribute information of the surface model, and metadata for each real object. The spatial interaction configuration information may also include the feedback setting information for each real object. In this case, identification information of the real object is associated with information of each real object.

The surface model may be diverted between frames. In this case, the spatial interaction information includes the diverted surface model and information for identifying a period in which the surface model is diverted. For example, when there is a real object which is not moving for a predetermined time, the content configuration information generation unit 150 records the surface model in association with a starting frame of the predetermined time and records time information regarding the diverting of the surface model (for example, an ending frame of the predetermined time). Thus, since a transmission amount can be reduced, it is possible to reduce a transmission delay.

<2.2.3. Flow of Recording Process>

Figure 6:
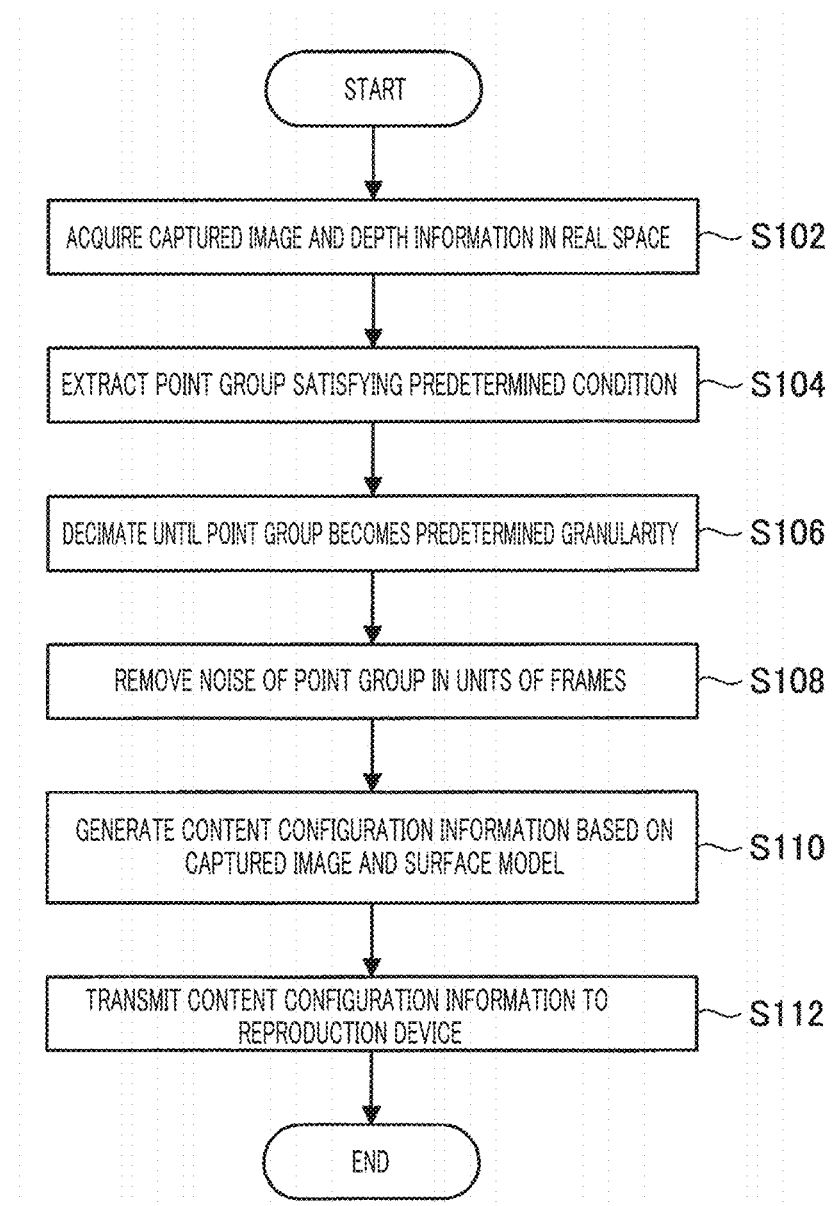
FIG. 6 is a flowchart illustrating an example of a flow of a recording process performed by the recording device according to the first embodiment.

FIG. 6 is a flowchart illustrating an example of a flow of a recording process performed by the recording device 10 according to the embodiment. As illustrated in FIG. 6, the image acquisition unit 110 first acquires a captured image of the real space and the depth information acquisition unit 130 acquires depth information (step S102).

Thereafter, the surface model acquisition unit 140 generates a surface model based on the depth information. Specifically, the surface model acquisition unit 140 extracts a point group (for example, a pixel group) forming the surface of the real object satisfying a predetermined condition based on the depth information (step S104). Here, the predetermined condition is, for example, a condition that the real object is a moving body, has a surface with a size exceeding a predetermined threshold, is a foreground, is a region in which an interaction is assumed to arise, and/or is not a region in which an interaction is to be prevented from arising. Subsequently, the surface model acquisition unit 140 decimates points until the point group becomes predetermined granularity (step S106). Subsequently, the surface model acquisition unit 140 removes noise of the point group in units of frames (step S108). In this way, the surface model acquisition unit 140 generates the surface model.

Then, the content configuration information generation unit 150 generates the content configuration information based on the capture image and the surface model (step S110). Thereafter, the transmission unit 160 transmits the content configuration information to the reproduction device 20 (step S112).

<2.3. Technical Features of Reproduction Device>

<2.3.1. Functional Configuration Example of Reproduction Device>

Figure 7:
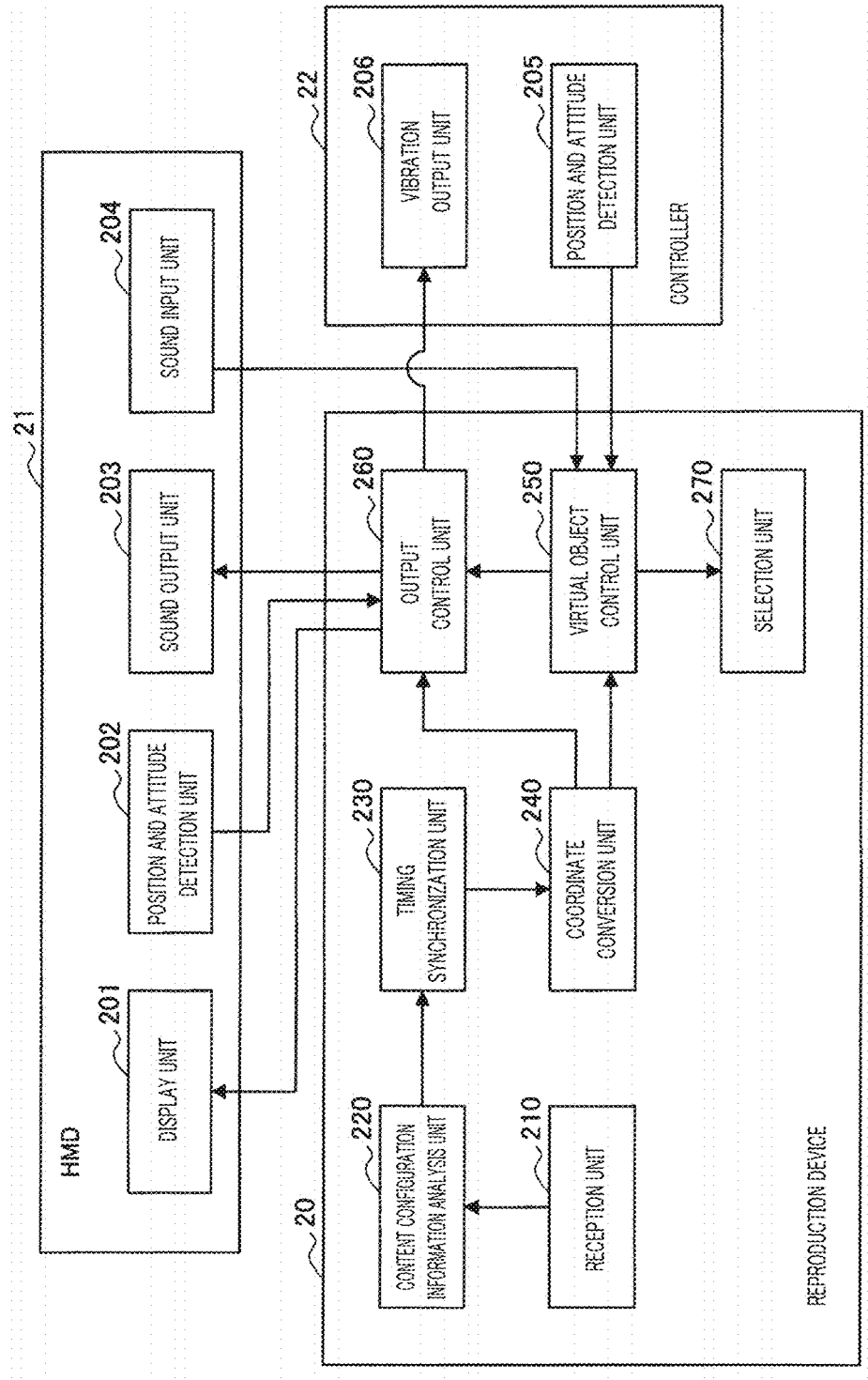
FIG. 7 is a block diagram illustrating an example of a functional configuration of the reproduction device according to the first embodiment.

FIG. 7 is a block diagram illustrating an example of a functional configuration of the reproduction device 20 according to the embodiment. As illustrated in FIG. 7, the reproduction device 20 includes a reception unit 210, a content configuration information analysis unit 220, a timing synchronization unit 230, a coordinate conversion unit 240, a virtual object control unit 250, an output control unit 260, and a selection unit 270.

FIG. 7 also illustrates an example of a functional configuration of the HMD 21 and the controller 22. As illustrated in FIG. 7, the HMD 21 includes a display unit 201, a position and attitude detection unit 202, a sound output unit 203, a sound input unit 204. The controller 22 includes a position and attitude detection unit 205 and a vibration output unit 206.

Hereinafter, the functional configuration will be described.

(1) HMD 21

(Display Unit 201)

The display unit 201 has a function of displaying the VR content. The display unit 201 displays the VR content based on control of the output control unit 260. For example, the display unit 201 can be realized by a liquid crystal display (LCD), an organic light-emitting diode (OLED), or the like.

(Position and Attitude Detection Unit 202)

The position and attitude detection unit 202 has a function of detecting a position and attitude of the HMD 21 (that is, the head of the user wearing the HMD 21). For example, the position and attitude detection unit 202 includes a gyro sensor and an acceleration sensor, detects an attitude based on an angular velocity, and detects a position through inertial navigation system (INS) calculation using the angular velocity and the acceleration. The position and attitude detection unit 202 outputs information indicating the detected position and attitude of the HMD 21 to the output control unit 260 of the reproduction device 20.

(Sound Output Unit 203)

The sound output unit 203 has a function of outputting a sound related to the VR content. For example, the sound output unit 203 includes a speaker or an earphone, an amplifier, and a digital analog converter (DAC). The sound output unit 203 reproduces four sounds based on the control of the output control unit 260.

(Sound Input Unit 204)

The sound input unit 204 has a function of inputting a speech of the user. For example, the sound input unit 204 includes a microphone, a microphone amplifier, an analog digital converter (ADC) and generates a digital signal indicating the speech of the user. The sound input unit 204 outputs information indicating the input speech of the user to the virtual object control unit 250.

(2) Controller 22

(Position and Attitude Detection Unit 205)

The position and attitude detection unit 205 has a function of detecting a position and attitude of the controller 22. For example, the position and attitude detection unit 205 includes a gyro sensor and an acceleration sensor, detects the attitude based on an angular velocity, and detects a position through inertial navigation system (INS) calculation using the angular velocity and the acceleration. The position and attitude detection unit 205 outputs information indicating the detected position and attitude of the controller 22 to the virtual object control unit 250.

(Vibration Output Unit 206)

The vibration output unit 206 has a function of outputting vibration. The vibration output unit 206 outputs the vibration based on the control of the output control unit 260. For example, the vibration output unit 206 can be realized by an eccentric motor, a linear resonant actuator (LRA), a voice coil motor (VCM), or the like.

(3) Reproduction Device 20

(Reception Unit 210)

The reception unit 210 has a function of receiving information from other devices. More specifically, the reception unit 210 functions as an acquisition unit that acquires the content configuration information from the recording device 10. The reception unit 210 receives the content configuration information corresponding to a viewpoint which is being selected, that is, the content configuration information generated based on a sensing result from the first sensor device 11 or the second sensor device 12 corresponding to the viewpoint which is being selected. The reception unit 210 outputs the received content configuration information to the content configuration information analysis unit 220.

(Content Configuration Information Analysis Unit 220)

The content configuration information analysis unit 220 has a function of extracting various kinds of information from the content configuration information. For example, the content configuration information analysis unit 220 separates and extracts the VR image information and the spatial interaction configuration information from the content configuration information and outputs the VR image information and the spatial interaction configuration information.

(Timing Synchronization Unit 230)

The timing synchronization unit 230 has a function of establishing timing synchronization between the captured image included in the VR image information and the surface model included in the spatial interaction configuration information. Specifically, the timing synchronization unit 230 establishes timing synchronization between the captured image and the surface model by associating the captured image with the surface model of which a detection time is the same as an imaging time of the captured image. At this time, the timing synchronization unit 230 establishes timing synchronization between the captured image and the surface model based on a frame number of the captured image and a frame number of the surface model. The timing synchronization unit 230 outputs the captured image and the surface model of which the timing synchronization is established, that is, the captured image and the surface model of which the detection time is the same as the imaging time of the captured image, to the coordinate conversion unit 240.

(Coordinate Conversion Unit 240)

The coordinate conversion unit 240 has a function of establishing synchronization of coordinate systems between the captured image included in the VR image information and the surface model included in the spatial interaction configuration information. The coordinate conversion unit 240 applies a coordinate conversion process to the surface model to correct a deviation between the coordinate system of the VR camera 101 and the coordinate system of the depth sensor 102 indicated by the sensor device position and attitude information. Specifically, the coordinate conversion unit 240 converts the three-dimensional position of the point group that forms the surface model into the three-dimensional position on the coordinate system of the VR camera 101 defined with the origin set based on the position of the VR camera 101 and the coordinate axes set based on the attitude of the VR camera 101. Thus, the three-dimensional position of the real object in the captured image disposed in the virtual space can match the three-dimensional position of the surface model of the real object. The coordinate conversion unit 240 outputs the captured image and the surface model of which the timing synchronization and the coordinate system synchronization are established to the output control unit 260 and the virtual object control unit 250.

(Virtual Object Control Unit 250)

The virtual object control unit 250 has a function of performing various kinds of control on the virtual object.

Control of Position and Attitude

The virtual object control unit 250 controls the position and attitude of a virtual object. Specifically, the virtual object control unit 250 calculates the position and attitude of the virtual object. With regard to the operator 41, the virtual object control unit 250 calculates the position and attitude of the operator 41 based on information indicating the position and attitude of the controller 22 output from the position and attitude detection unit 205.

The virtual object control unit 250 performs physical calculation on the virtual object. For example, the virtual object control unit 250 calculates movement of the virtual object in the virtual space and calculates the position and attitude of the virtual object after the movement when virtual objects collide with each other or a virtual object is thrown. Attribute information such as a physical coefficient associated with a real object is taken into consideration in physical calculation in which the real object in the captured image disposed in the virtual space is involved.

The virtual object control unit 250 outputs a calculation result of the position and attitude of the virtual object to the output control unit 260.

Association of Collider

The virtual object control unit 250 associates a collider with the virtual object. In particular, the virtual object control unit 250 associates the collider with a real object in the captured image disposed in the virtual space. Thus, it is possible to detect a collision between the real object and another virtual object in the captured image disposed in the virtual space. Hereinafter, the association of the collider will be described in detail.

The virtual object control unit 250 associates the surface model of which the timing synchronization and the coordinate system synchronization are established with the captured image, with the captured image disposed in the virtual space. More simply, the virtual object control unit 250 associates the surface model of the real object with the real object in the captured image disposed in the virtual space.

The virtual object control unit 250 associates the collider with the surface model disposed in the virtual space, more specifically, each of the points included in the surface model. Specifically, the virtual object control unit 250 uses the three-dimensional position information of the surface model as the three-dimensional position information of the collider. Thus, a collision with the real object in the captured image disposed in the virtual space can be determined.

Further, the virtual object control unit 250 associates the attribute information such as a physical coefficient with the surface model disposed in the virtual space. Thus, a feeling and a rebound or the like at the time of collision between the virtual object and the real object in the captured image disposed in the virtual space can be expressed.

Collision Detection

The virtual object control unit 250 also functions as a collision detection unit that detects a collision between virtual objects. For example, the virtual object control unit 250 detects a collision between virtual objects by determining a collision between colliders associated with the virtual objects.

The virtual object control unit 250 also detects a collision between a virtual object and a real object in the captured image disposed in the virtual space. In this case, the virtual object control unit 250 detects a collision between another virtual object and the real object in the captured image displayed in the virtual space based on the 3-dimensional position information of the other virtual object and the surface model. Specifically, the virtual object control unit 250 detects a collision between a collider associated with the surface model associated with the real object in the captured image disposed in the virtual space and a collider associated with the virtual object.

The virtual object control unit 250 can acquire information regarding a collision situation such as a relative speed and a collision angle at the time of collision based on a chronological change in the position and attitude of the virtual object.

The virtual object control unit 250 outputs information regarding presence or absence of a collision and a collision situation to the output control unit 260.

Others

The virtual object control unit 250 may control the virtual object based on a voice instruction of a user input to the sound input unit 204. For example, the virtual object control unit 250 generates a virtual object formed from text information indicating speech of the user and moves the virtual object in the virtual space or moves the mouth of the virtual object of an avatar corresponding to the user.

(Output Control Unit 260)

The output control unit 260 has a function of displaying the captured image in the virtual space based on the content configuration information. For example, the output control unit 260 displays the captured image in the virtual space by disposing the captured image in the virtual space.

The output control unit 260 moves the position of the user or rotates a visual field in the virtual space based on the information indicating the position and attitude of the HMD 21 output from the position and attitude detection unit 202. The movement of the position of the user in the virtual space can be realized by zooming-in/out of the captured image disposed in the virtual space. That is, the movement of the position of the user in the virtual space is realized by moving the captured image in the virtual space with a vector opposite to a movement vector at the position of the user. The rotation of the visual field in the virtual space can be realized by moving a region displayed on the display unit 201 in the captured image disposed in the virtual space. Thus, the user can move freely in the VR content and can enjoy an experience of being able to be see 360 degrees therearound.

The output control unit 260 has a function of controlling display of the virtual object. For example, the output control unit 260 displays the virtual object at the position and attitude calculated by the virtual object control unit 250.

The output control unit 260 has a function of controlling outputs of feedbacks corresponding to an interaction in which the real object included in the captured image displayed in the virtual space is involved based on the content configuration information. For example, when a collision between another virtual object and the real object included in the captured image displayed in the virtual space is detected, the output control unit 260 controls the output of the visual, tactile, auditory and/or olfactory feedback corresponding to the collision to the user.

Visual Feedback

When a collision between the virtual objects is detected, the output control unit 260 may cause the display unit 201 to output the visual feedback. For example, when the operator 41 collides with the real object in the captured image disposed in the virtual space, the output control unit 260 causes the display unit 201 to output information indicating the collision. The output control unit 260 may control the information which the display unit 201 is caused to output based on information regarding a collision situation. When one of the virtual objects which have collided is the real object in the captured image disposed in the virtual space, the information which the display unit 201 is caused to output is determined based on the physical coefficient and/or the visual feedback setting information associated with the surface model.

Tactile Feedback

When a collision between the virtual objects is detected, the output control unit 260 may cause the vibration output unit 206 to output a tactile feedback. For example, when the operator 41 collides with the real object in the captured image disposed in the virtual space, the output control unit 260 causes the vibration output unit 206 to output vibration indicating the collision. The output control unit 260 may designate parameters related to the vibration which the vibration output unit 206 is caused to output based on information regarding a collision situation. As the parameter related to the vibration, a frequency, an amplitude, a vibration time, and the like of vibration to be output can be exemplified.

When one of the virtual objects which have collided is the real object in the captured image disposed in the virtual space, the vibration parameters are determined based on the physical coefficient and/or the tactile feedback setting information associated with the surface model.

Auditory Feedback

When a collision between the virtual objects is detected, the output control unit 260 may cause the sound output unit 203 to output an auditory feedback. For example, when the operator 41 collides with the real object in the captured image disposed in the virtual space, the output control unit 260 causes the sound output unit 203 to output a sound indicating the collision. The output control unit 260 may designate parameters related to the sound which the sound output unit 203 is caused to output based on information regarding a collision situation. As the parameters related to the sound, a kind and volume of the sound to be reproduced can be exemplified. When one of the virtual objects which have collided is the real object in the captured image disposed in the virtual space, the parameters related to the sound are determined based on the physical coefficient and/or the auditory feedback setting information associated with the surface model.

Olfactory Feedback

When a collision between the virtual objects is detected, the output control unit 260 may cause an olfactory output device (not illustrated) to output an olfactory feedback. For example, when the operator 41 collides with the real object in the captured image disposed in the virtual space, the output control unit 260 causes the olfactory output device to output a scent indicating the collision. The output control unit 260 may designate parameters related to the scent which the olfactory output device is caused to output based on information regarding a collision situation. As the parameters related to the scent, a kind of scent and the intensity of the scent can be exemplified. When one of the virtual objects which have collided is the real object in the captured image disposed in the virtual space, the parameters related to the scent are determined based on the physical coefficient and/or the olfactory feedback setting information associated with the surface model.

Supplement

After the collision between the virtual objects is detected, the output control unit 260 may cause the visual/tactile/auditory/olfactory feedback to be output until a predetermined stop condition is established. The predetermined stop condition is, for example, elapse of a predetermined time after the collision arises, a distance between the virtual objects exceeding the predetermined distance, or the like. Thus, it is possible to provide an aftermath of the collision to the user.

In this way, the visual, tactile, auditory, or olfactory interaction in which the real object in the captured image disposed in the virtual space is involved is realized.

(Selection Unit 270)

The selection unit 270 has a function of selecting a viewpoint (that is, switching the VR content to be reproduced). More specifically, the selection unit 270 selects whether the content configuration information which is an origin of the VR content to be reproduced is the content configuration information generated based on the sensing result from a certain sensor device. The viewpoint is selected, for example, when the content ID is selected. The selection unit 270 may transmit information (for example, a content ID) indicating a selection result to the recording device 10 and switch the content configuration information to be received.

<2.3.2. Spatial Interaction>

(1) First Spatial Interaction

A first spatial interaction is an interaction between the user and the real object in the captured image disposed in the virtual space. The interaction has been described above with reference to FIG. 3. Specifically, when the operator 41 operated by the user collides with the real object (the stage 16 or the performer 18) in the captured image disposed in the virtual space, the reproduction device 20 causes the controller 22 to output a tactile feedback corresponding to the collision. A flow of a process related to this interaction will be described with reference to FIG. 8.

Figure 8:
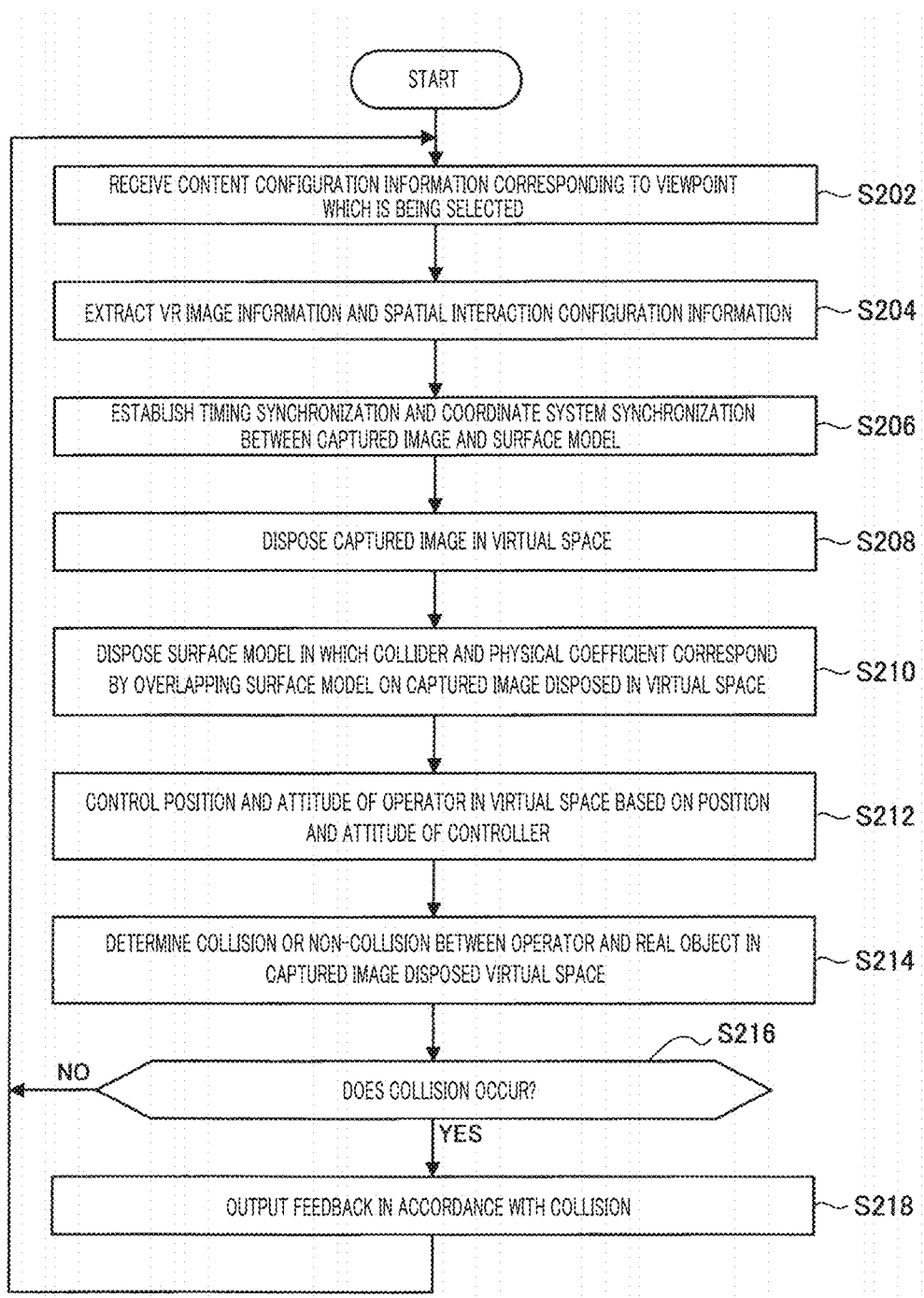
FIG. 8 is a flowchart illustrating an example of a flow of a first spatial interaction process performed by the reproduction device according to the first embodiment.

FIG. 8 is a flowchart illustrating an example of a flow of the first spatial interaction process performed by the reproduction device 20 according to the embodiment. As illustrated in FIG. 8, the reception unit 210 first receives the content configuration information corresponding to a viewpoint which is being selected (step S202). Subsequently, the content configuration information analysis unit 220 extracts the VR image information and the spatial interaction configuration information from the content configuration information (step S204). Subsequently, the timing synchronization unit 230 establishes the timing synchronization between the captured image and the surface model and the coordinate conversion unit 240 establishes the coordinate system synchronization between the captured image and the surface model (step S206). Subsequently, the output control unit 260 disposes the captured image in the virtual space (step S208).

Next, the virtual object control unit 250 disposes the surface model in which the collider is associated with the physical coefficient by overlapping the surface model on the captured image disposed in the virtual space (step S210). Subsequently, the virtual object control unit 250 controls the position and attitude of the operator 41 in the virtual space based on the position and attitude of the controller 22 (step S212). Subsequently, the virtual object control unit 250 determines collision or non-collision between the operator 41 and the real object in the captured image disposed in the virtual space (step S214). Specifically, the virtual object control unit 250 determines collision or non-collision between the collider associated with the operator 41 and the collider associated with the surface model overlapped on the captured image disposed in the virtual space. When the collision is determined not to arise (step S216/NO), the process returns to step S202. When the collision is determined to arise (step S216/YES), the output control unit 260 outputs a feedback in accordance with the collision (step S218). Specifically, the output control unit 260 controls the output of the visual/tactile/auditory/olfactory feedback to the user based on the physical coefficient and the feedback setting information associated with the surface model. Thereafter, the process returns to step S202.

(2) Second Spatial Interaction

A second spatial interaction is an interaction between the real object in the captured image disposed in the virtual space and a virtual object other than the operator 41. This interaction will be described in detail with reference to FIG. 9.

Figure 9:
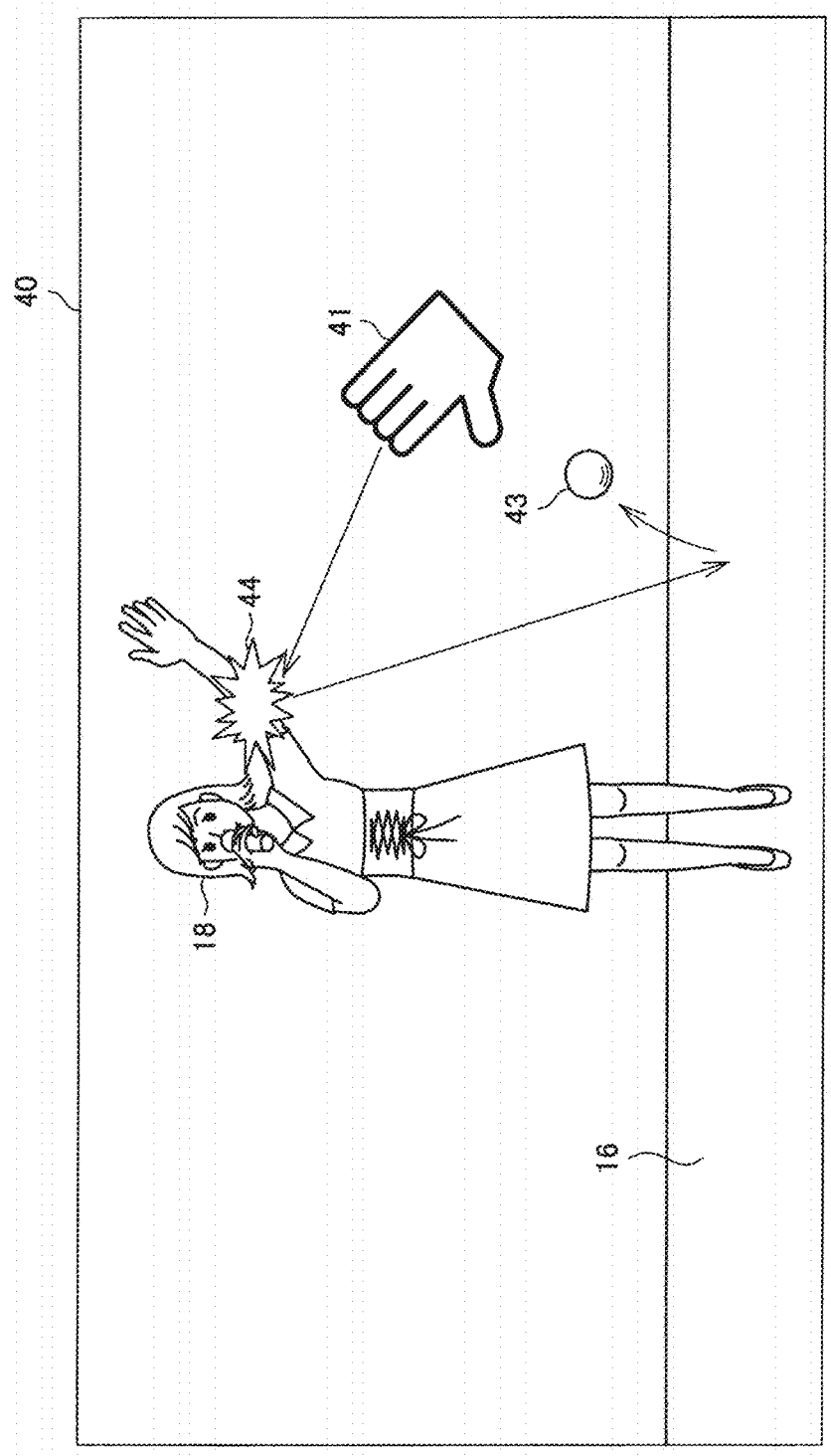
FIG. 9 is a diagram illustrating an example of a second spatial interaction according to the first embodiment.

FIG. 9 is a diagram illustrating an example of the second spatial interaction according to the embodiment. In the VR content 40 illustrated in FIG. 9, a captured image including the performer 18 on the stage 16 illustrated in FIG. 2 is disposed in the virtual space, and the surface model is associated with each of the stage 16 and the performer 18 in the captured image. The user can perform an operation of holding the operator 41 at a position of a ball 43 which is a virtual object in the virtual space and throwing the ball through the controller 22. When the holding operation is performed, the ball 43 becomes a child object of the operator 41 and the operator 41 becomes a parent object of the ball 43. A movement of the child object links with the parent object. When the throwing operation is performed, a parent-child relation is released and the child object moves in the air in accordance with a result of physical calculation. When the user holds and throws the ball 43 to the performer 18, the ball 43 collides with the performer 18 and rebounds. An icon 44 indicating the collision is displayed as a visual feedback at that time. Further, the ball 43 rebounding from the performer 18 collides with the stage 16 and rolls. At this time, the output control unit 260 may display a shadow of the ball 43 on the stage 16 or output a rolling sound. A flow of a process related to the interaction will be described with reference to FIGS. 10A and 10B.

Figure 10A:
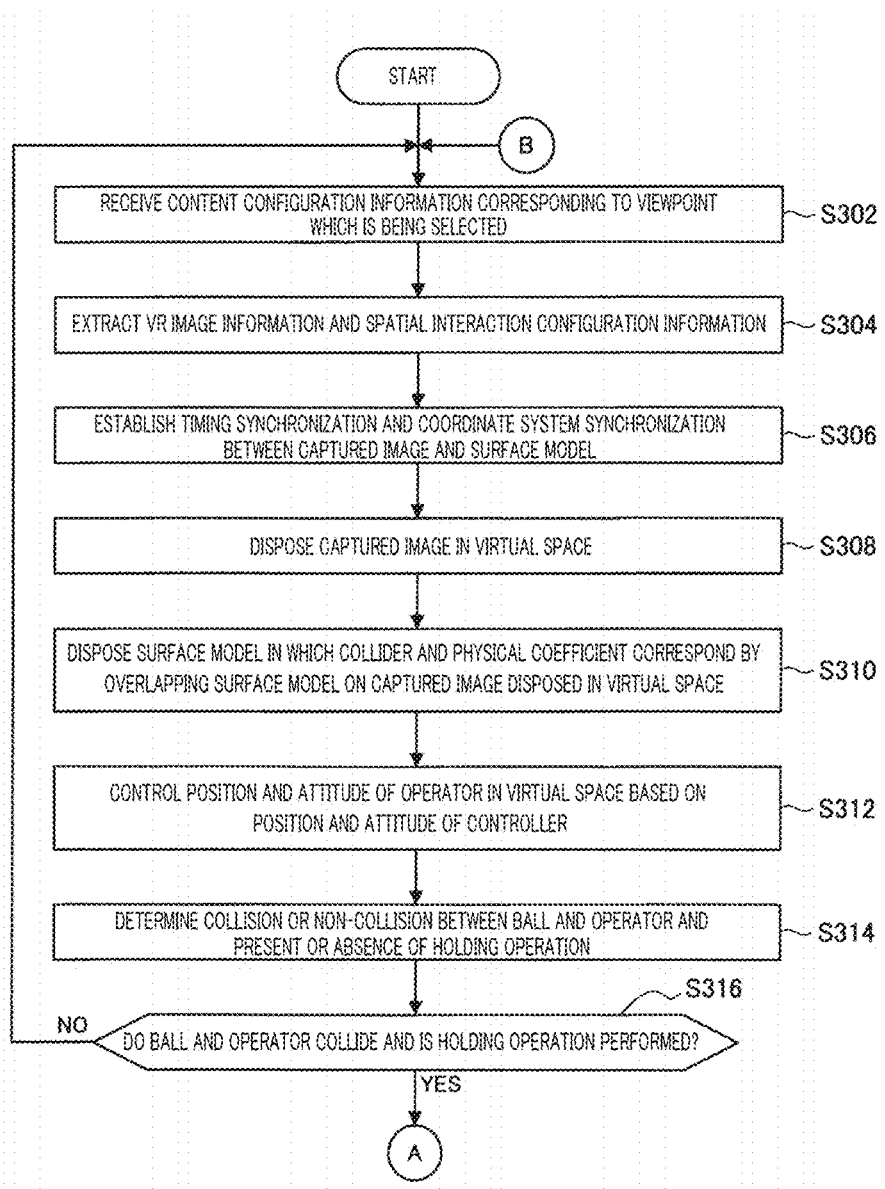
FIG. 10A is a flowchart illustrating an example of a flow of the second spatial interaction process performed by the reproduction device according to the first embodiment.
Figure 10B:
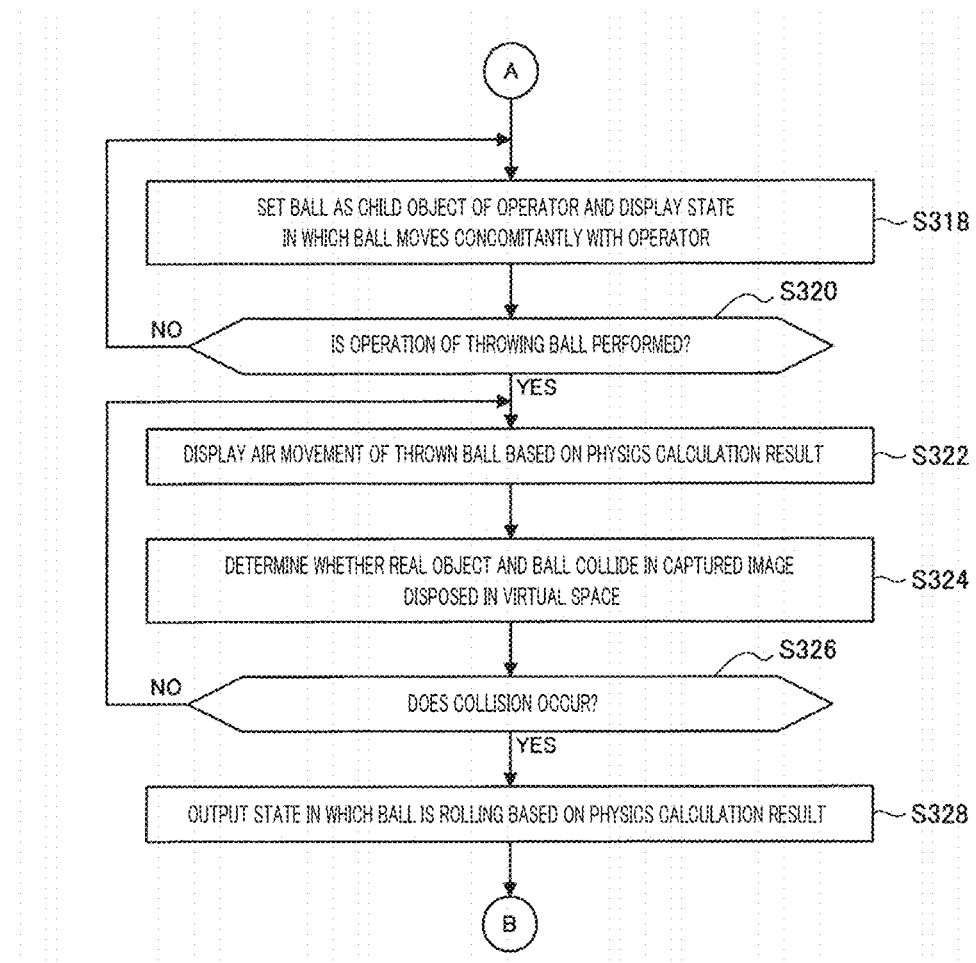
FIG. 10B is a flowchart illustrating an example of the flow of the second spatial interaction process performed by the reproduction device according to the first embodiment.

FIGS. 10A and 10B are flowcharts illustrating an example of a flow of the second spatial interaction process performed by the reproduction device 20 according to the embodiment. A process of steps S302 to S312 illustrated in FIG. 10A is similar to the process of steps S202 to S212 illustrated in FIG. 8. Thereafter, the virtual object control unit 250 determines collision or non-collision between the ball 43 and the operator 41 and presence or absence of the holding operation (step S314). Specifically, the virtual object control unit 250 determines collision or non-collision between the collider corresponding to the ball 43 with the collider corresponding to the operator 41 and determines whether the holding operation is input. When the collision is determined not to arise or the holding operation is determined not to be performed (step S316/NO), the process returns to step S302.

When the collision is determined to arise and the holding operation is determined to be performed (step S316/YES), as illustrated in FIG. 10B, the virtual object control unit 250 sets the ball 43 as the child object of the operator 41 and the output control unit 260 displays an aspect in which the ball 43 moves concomitantly with the operator 41 (step S318). Subsequently, the virtual object control unit 250 determines whether the operation of throwing the ball 43 is determined (step S320). When it is determined that the throwing operation is not performed (step S320/NO), the process returns to step S318. When it is determined that the throwing operation is performed (step S320/YES), the output control unit 260 displays a movement of the thrown ball 43 in the air based on a result of the physical calculation by the virtual object control unit 250 (step S322). Subsequently, the virtual object control unit 250 determines whether the ball 43 collides with the real object (the stage 16 or the performer 18) in the captured image disposed in the virtual space (step S324). When collision is determined not to arise (step S326/NO), the process returns to step S322.

When collision is determined to arise (step S326/YES), the output control unit 260 displays an aspect in which the ball 43 is rolling based on a result of the physical calculation by the virtual object control unit 250 (step S328). For example, the virtual object control unit 250 performs the physical calculation based on the attribute information of the points corresponding to the colliders determined to collide, and the output control unit 260 displays a rolling trajectory of the ball 43 based on a result of the physical calculation. At this time, the output control unit 260 may control the output of the visual/tactile/auditory/olfactory feedback to the user based on the physical coefficient and the feedback setting information associated with the surface model. For example, the output control unit 260 displays an icon indicating the collision, displays a shade of the ball, and reproduces a rolling sound of the ball. Thereafter, the process returns to step S302.

<2.3.3. Viewpoint Switching>

The selection unit 270 selects the content configuration information corresponding to the position of the user in the virtual space as the content configuration information to be acquired by the reception unit 210. That is, the selection unit 270 switches the VR content to be reproduced in accordance with the position of the user in the virtual space. The selection unit 270 switches the viewpoint based on the viewpoint switching object. Hereinafter, this point will be described in detail.

The virtual object control unit 250 sets the viewpoint switching object in the virtual space based on the viewpoint switching object information. Specifically, the virtual object control unit 250 disposes the viewpoint switching object at a three-dimensional position designated in the viewpoint switching object information and associates the collider, a content ID, and the viewpoint switching position with the viewpoint switching object. The content ID is a content ID of the VR content of a switching destination when the switching of the viewpoint based on the viewpoint switching object is performed. The viewpoint switching position is a predetermined position in the virtual space and can be set as the viewpoint movement setting information. The viewpoint switching object is not displayed typically.

The virtual object control unit 250 detects a collision between a visual line of the user and the viewpoint switching object. Specifically, the virtual object control unit 250 detects the collision based on the collider associated with the viewpoint switching object. Here, the visual line of the user may be an eye axis direction or a face direction. In the former case, the virtual object control unit 250 recognizes the visual line of the user based on an image recognition result of a captured image of the eyes of the user. In the latter case, the virtual object control unit 250 recognizes the visual line of the user based on a detection result from the position and attitude detection unit 202.

When a collision between the visual line of the user and the viewpoint switching object is detected, the output control unit 260 moves the position of the user. Specifically, the output control unit 260 continuously moves the position of the user in the virtual space to the viewpoint switching position associated with the viewpoint switching object. The continuous movement of the position of the user is performed by zooming in/out the captured image disposed in the virtual space until a magnification corresponding to the viewpoint switching position is obtained. The movement of the position of the user to the viewpoint switching position may be performed based on a user operation such as swing.

Then, the selection unit 270 sets an arrival of the position of the user to the viewpoint switching position in the virtual space as a trigger and switches the content configuration information to be selected. Specifically, the selection unit 270 switches the content configuration information to be selected when a zoom-in/out magnification of the captured image disposed in the virtual space becomes a predetermined magnification. The selection unit 270 selects the content ID associated with the viewpoint switching object corresponding to the arrived viewpoint switching position as the content ID of the VR content of the switching destination. That is, the selection unit 270 selects the content configuration information with the content ID associated with the viewpoint switching object corresponding to the arrived viewpoint switching position as the content configuration information which is the origin for generating the VR content to be reproduced.

The viewpoint switching position is preferably a position in the virtual space corresponding to the position of the imaging device (that is, the VR camera 101) imaging the captured image which is the origin of the content configuration information of the switching destination. Specifically, it is preferable that the viewpoint switching position in the virtual space be within a predetermined distance or match a position when the position of the VR camera 101 capturing the captured image which is the origin of the content configuration information of the switching destination is mapped to the virtual space. In this case, since the distance to the real object in the captured image disposed in the virtual space is the same before and after the switching, a scale sensation of the real object before and after the switching is the same. Thus, it is possible to prevent the user from feeling a sensation of discomfort such as an instantaneous viewpoint movement at the time of switching of the viewpoint.

The viewpoint switching based on the viewpoint switching object will be described in detail with reference to FIG. 11.

FIG. 11 is a diagram illustrating viewpoint switching based on a viewpoint switching object according to the embodiment. As illustrated in FIG. 11, VR content #1 is assumed to be VR content at a viewpoint which is being selected. That is, the reproduction device 20 is assumed to reproduce VR content #1. In VR content #1, viewpoint switching objects associated with VR content #2-1, VR content #2-2, and VR content #2-3 are disposed. A number immediately after "#" attached to VR content indicates a layer of a selected viewpoint and a number after "-" is an index in the same layer. When the switching of the viewpoint is performed based on the viewpoint switching object associated with VR content #2-1, the reproduction device 20 reproduces VR content #2-1. When the switching of the viewpoint is performed based on the viewpoint switching object associated with VR content #2-2, the reproduction device 20 reproduces VR content #2-2. When the switching of the viewpoint is performed based on the viewpoint switching object associated with VR content #2-3, the reproduction device 20 reproduces VR content #2-3. Thereafter, the viewpoint is switched similarly.

Specific Example

Hereinafter, a specific example of switching of a viewpoint will be described specifically with reference to FIGS. 12 to 15.

Figure 12:
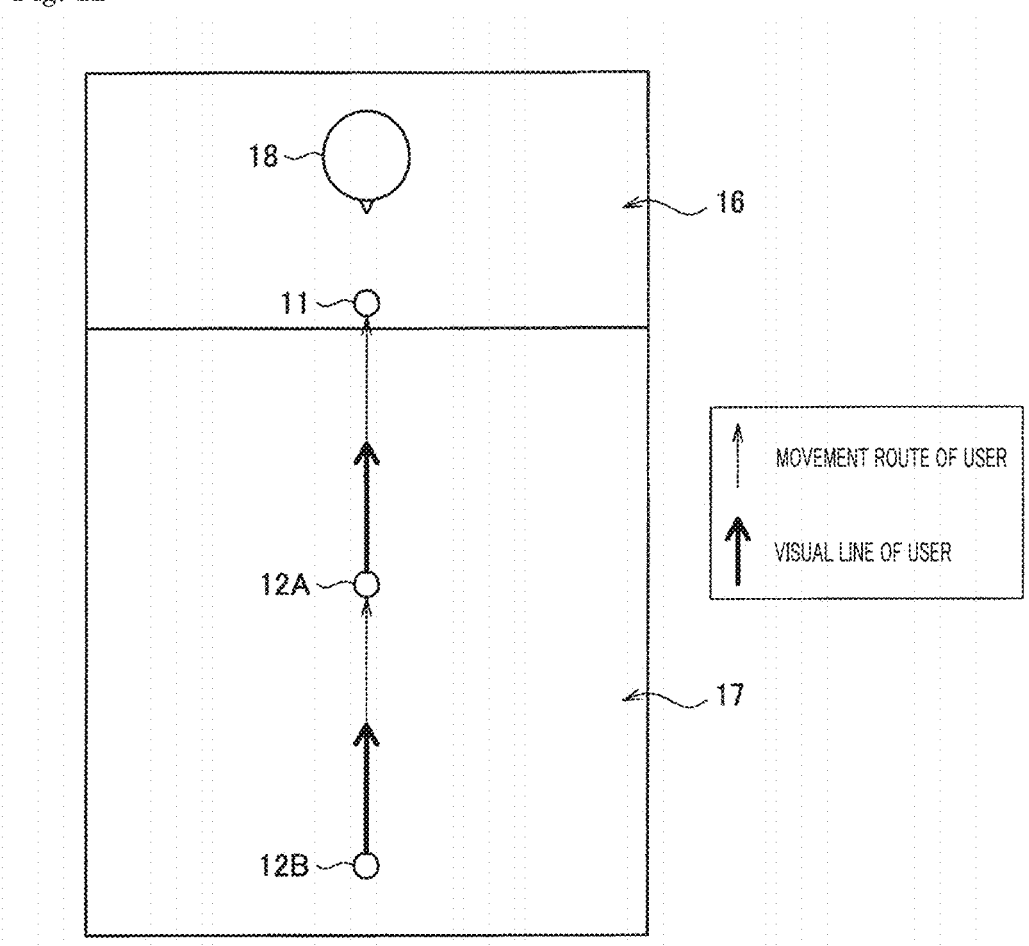
FIG. 12 is a diagram illustrating an example of movement and switching of a position of a user according to the first embodiment.

FIG. 12 is a diagram illustrating an example of movement and switching of a position of a user according to the embodiment. FIG. 12 illustrates an aspect of a movement trajectory of a position of a user and switching of a viewpoint performed by the reproduction device 20 and an aspect of mapping of a visual line of the user to a recording target space. As illustrated in FIG. 12, the first sensor device 11 is disposed on the stage 16 on which the performer 18 stands, the second sensor device 12A is disposed near the stage 16 in the spectator stand 17, and the second sensor device 12B is disposed farthest from the stage 16.

Figure 13:
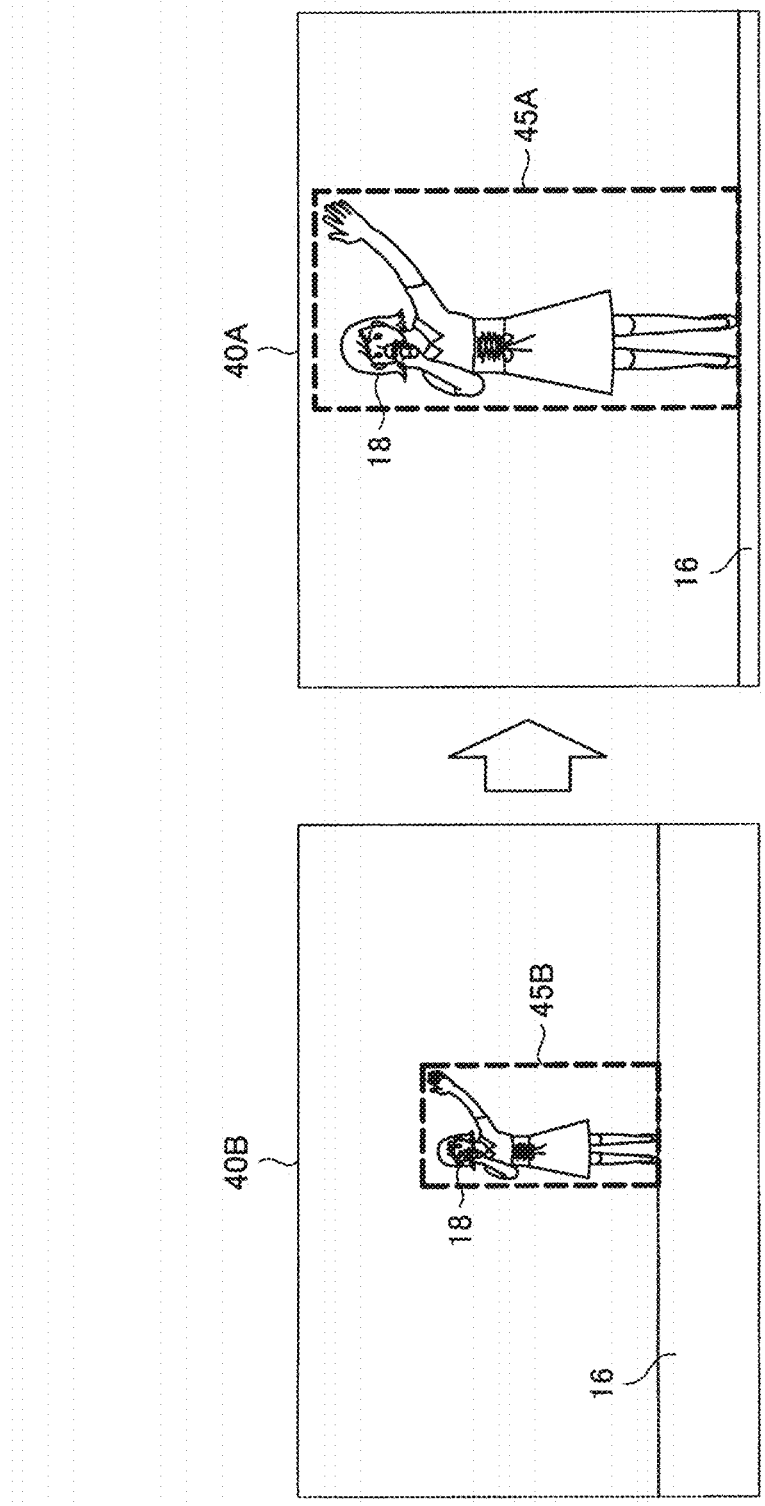
FIG. 13 is a diagram illustrating an example of viewpoint switching of VR content in which captured images captured by sensor devices disposed as in FIG. 12 are used.

FIG. 13 is a diagram illustrating an example of viewpoint switching of VR content in which captured images captured by the sensor devices disposed as in FIG. 12 are used. VR content 40B is VR content in which the captured image captured by the second sensor device 12B is disposed in the virtual space. It is assumed that the virtual object control unit 250 disposes a viewpoint switching object 45B that has a size and a 3-dimensional position and includes the performer 18 in the VR content 40B and causes identification information of the second sensor device 12A to associated as a content ID. When the visual line of the user collides with the viewpoint switching object 45B and the position of the user moves to the viewpoint switching position, the selection unit 270 selects the viewpoint based on the content ID associated with the viewpoint switching object 45B. Specifically, the selection unit 270 selects the content configuration information generated based on the sensing result from the second sensor device 12A as the content configuration information which is the origin of the VR content to be reproduced. As a result, the output control unit 260 switches the display to the VR content 40A in which the captured image captured by the second sensor device 12A is disposed in the virtual space.

Here, the viewpoint switching position in the virtual space preferably matches the position corresponding to the position of the second sensor device 12A in the real space. In this case, the selection unit 270 performs switching to the VR content 40A when the position of the user in the virtual space arrives at a position corresponding to the position of the second sensor device 12A in the real space. Thus, since the distance to the performer 18 is the same before and after the switching, the scale sensation of the performer 18 is the same before and after the switching. Accordingly, it is possible to prevent the user from feeling a sensation of discomfort such as an instantaneous viewpoint movement at the time of switching of the viewpoint.

The virtual object control unit 250 disposes the viewpoint switching object 45A that has a size at a 3-dimensional position and includes the performer 18 in the VR content 40A causes identification information of the first sensor device 11 to associated as a content ID. When the visual line of the user collides with the viewpoint switching object 45A and the position of the user moves to the viewpoint switching position, the selection unit 270 selects the viewpoint based on the content ID associated with the viewpoint switching object 45A. Specifically, the selection unit 270 selects the content configuration information generated based on the sensing result from the first sensor device 11 as the content configuration information which is the origin of the VR content to be reproduced. As a result, the output control unit 260 switches the display to the VR content in which the captured image captured by the first sensor device 11 is disposed in the virtual space.

Here, the viewpoint switching position in the virtual space preferably matches the position corresponding to the position of the first sensor device 11 in the real space. In this case, the selection unit 270 performs switching to the VR content in which the captured image captured by the first sensor device 11 is disposed in the virtual space when the position of the user in the virtual space arrives at a position corresponding to the position of the first sensor device 11 in the real space. Thus, since the distance to the performer 18 is the same before and after the switching, the scale sensation of the performer 18 is the same before and after the switching. Accordingly, it is possible to prevent the user from feeling a sensation of discomfort at the time of switching of the viewpoint.

In this way, by repeating the switching of the viewpoint with the movement of the position of the user, it is possible to provide the user with an experience of moving continuously in the recording target space. By matching the viewpoint switching position with the position of the VR camera 101, it is possible to prevent the user from feeling a sensation of discomfort caused due to the switching of the viewpoint and prevent the user experience from deteriorating.

Supplement

Figure 14:
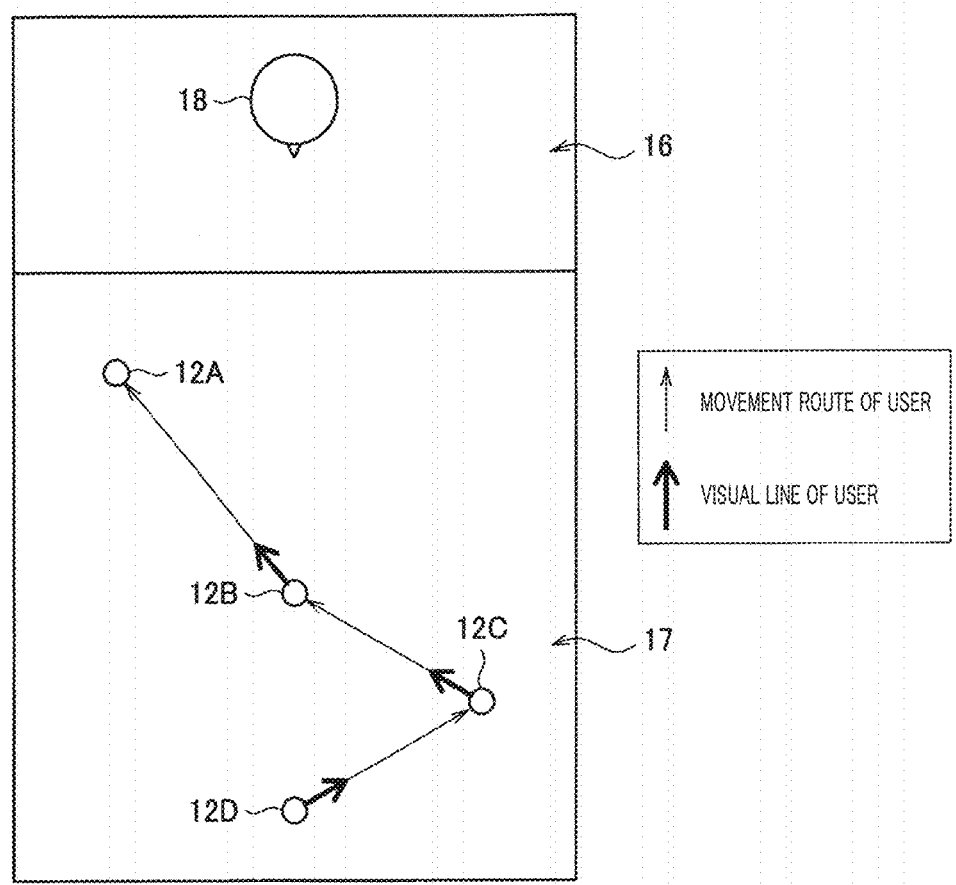
FIG. 14 is a diagram illustrating an example of movement of a position of a user and switching of a viewpoint according to the first embodiment.

FIG. 14 is a diagram illustrating an example of movement of the position of the user and switching of a viewpoint according to the embodiment. FIG. 14 illustrates an aspect in which a movement trajectory of the position of the user and the switching of the viewpoint performed by the reproduction device 20 and an aspect of mapping of a visual line of the user to a recording target space. As illustrated in FIG. 14, the performer 18 stands on the stage 16 and second sensor devices 12A to 12D are disposed in the spectator stand 17.

In the example illustrated in FIG. 14, in the VR content in which the second sensor device 12D is set as a viewpoint, a viewpoint switching position is set to the position of the second sensor device 12C. With movement of the user to the position of the second sensor device 12C which is set as a viewpoint switching position, switching to VR content in which the second sensor device 12C is set as a viewpoint is performed. Similarly, switching to VR content in which the second sensor device 12B is set as a viewpoint and switching to VR content in which the second sensor device 12A is set as a viewpoint are performed. A movement trajectory of the position of the user is preferably a straight line between the viewpoints. On the other hand, as illustrated in FIG. 14, the movement trajectory between the plurality of viewpoints may not be a straight line.

Figure 15:
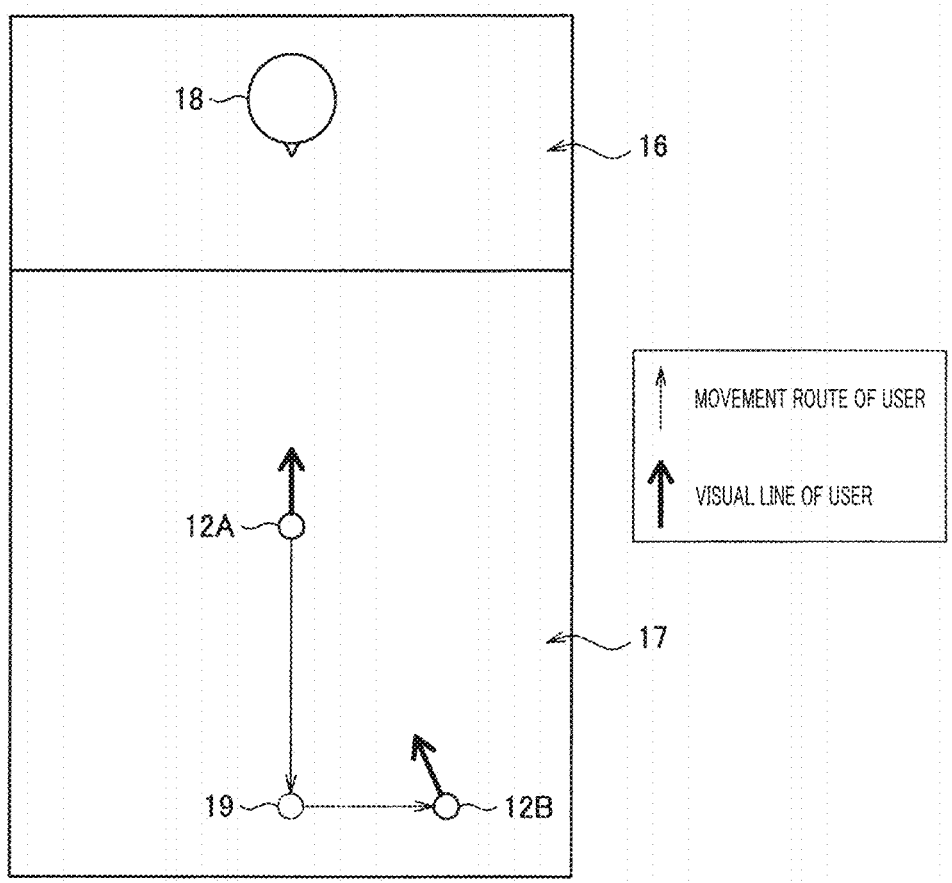
FIG. 15 is a diagram illustrating an example of movement of a position of a user and switching of a viewpoint according to the first embodiment.

FIG. 15 is a diagram illustrating an example of movement of the position of the user and switching of a viewpoint according to the embodiment. FIG. 15 illustrates an aspect in which a movement trajectory of the position of the user and the switching of the viewpoint performed by the reproduction device 20 and an aspect of mapping of a visual line of the user to a recording target space. As illustrated in FIG. 15, the performer 18 stands on the stage 16 and second sensor devices 12A and 12B are disposed in the spectator stand 17. In FIG. 15, as in the example illustrated in FIG. 13, a viewpoint switching object is assumed to be disposed so that the performer 18 is included.

The reproduction device 20 is assumed to reproduce VR content in which the second sensor device 12A is set as a viewpoint. As illustrated in FIG. 15, the user is assumed to move his or her position backward, facing his or her visual line to the performer 18. The backward movement of the position of the user is realized by zooming out a captured image disposed in the virtual space in the VR content in which the second sensor device 12A is set as the viewpoint. When the position of the user is moved to a viewpoint switching position 19, switching is performed from the VR content in which the second sensor device 12A is set as the viewpoint to the VR content in which the second sensor device 12B is set as the viewpoint. In this case, from the viewpoint switching position 19 to the position of the second sensor device 12A, the user may also feel a sensation of discomfort such as instantaneous movement of the viewpoint.

Accordingly, a distance between the viewpoint switching position and a predetermined real object in the captured image displayed in the virtual space is preferably the same as a distance between the predetermined real object and a position, in the virtual space, corresponding to the position of the imaging device (that is, the VR camera 101) capturing the captured image which is an origin of the content configuration information of a switching destination. In the example illustrated in FIG. 15, the distance between the performer 18 and the viewpoint switching position 19 is preferably the same as the distance between the performer 18 and the position of the second sensor device 12B. The same means that the distances are equal or a difference between the distances is within a predetermined range. In this case, the scale sensation of the performer 18 is the same before and after the switching. Therefore, it is possible to reduce the sensation of the discomfort which the user feels.

Since an angle between the viewpoint switching position 19 and the performer 18 differs from an angle between the position of the second sensor device 12B and the performer 18, an angle at which the performer 18 is seen may be changed before and after the movement. Thus, the user may feel a sensation of discomfort. Accordingly, the output control unit 260 may dispose the captured image in the virtual space so that the predetermined real object in the captured image displayed in the virtual space collides with the visual line of the user after the virtual object control unit 250 switches the VR content. Specifically, the output control unit 260 rotates a visual field so that the performer 18 is located on the visual line of the user (for example, the front of the face of the user) at the time of switching of the viewpoint. Thus, since the angle at which the user sees the performer 18 is not changed before and after the switching, it is possible to reduce the sensation of discomfort which the user feels. A rotation amount of the visual field after the movement can be set as the viewpoint movement setting information.

Flow of Process

Next, an example of a flow of a viewpoint switching process will be described with reference to FIG. 16.

Figure 16:
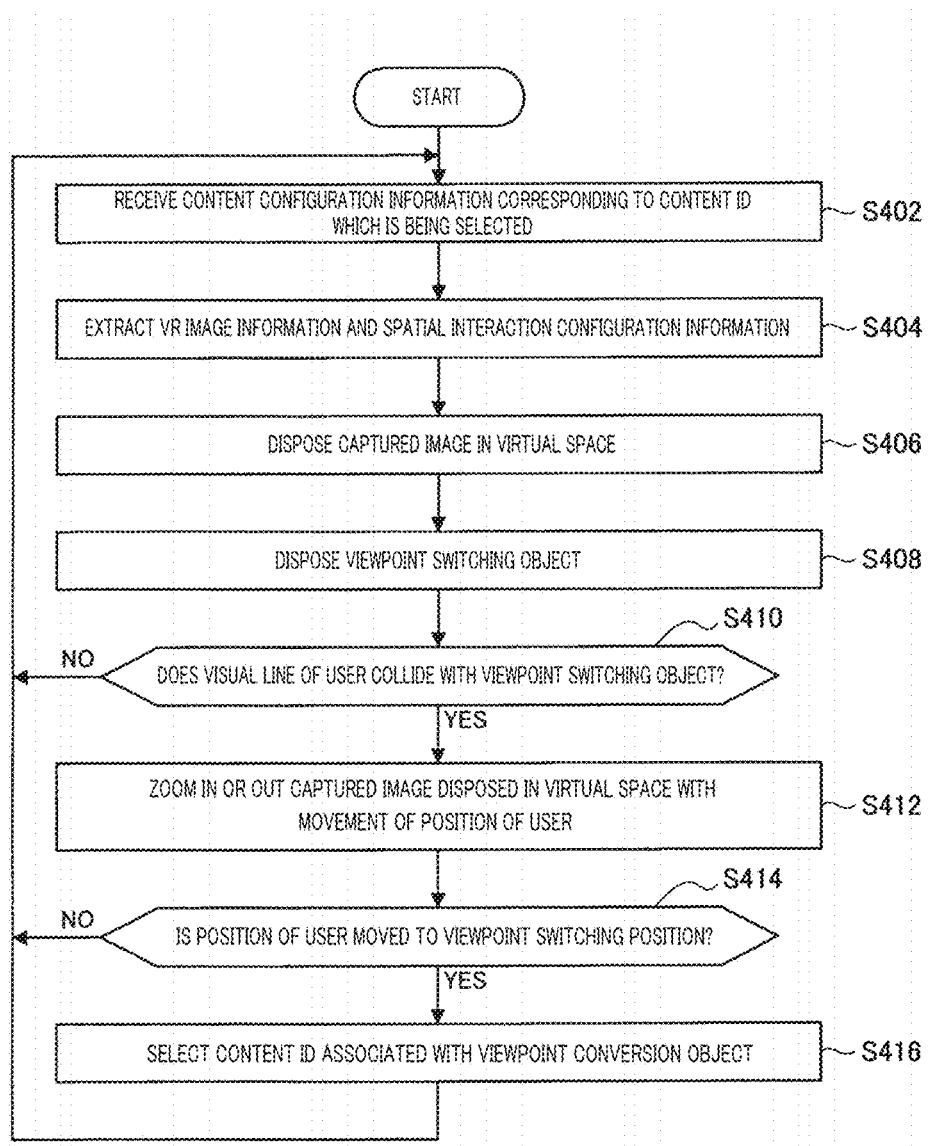
FIG. 16 is a flowchart illustrating an example of a flow of a viewpoint switching process performed by the reproduction device according to the embodiment.

FIG. 16 is a flowchart illustrating an example of the flow of the viewpoint switching process performed by the reproduction device 20 according to the embodiment. In the process based on the flowchart illustrated in FIG. 16, a process other than a process involved in the switching of the viewpoint is omitted.

As illustrated in FIG. 16, the reception unit 210 first receives the content configuration information corresponding to a viewpoint which is being selected (step S402). Subsequently, the content configuration information analysis unit 220 extracts VR image information and spatial interaction configuration information from the content configuration information (step S404). Subsequently, the output control unit 260 disposes the captured image in the virtual space (step S406). Subsequently, the virtual object control unit 250 disposes the viewpoint switching object in the virtual space based on the viewpoint switching object information (step S408).

Subsequently, the virtual object control unit 250 determines whether the visual line of the user collides with the viewpoint switching object (step S410). When it is determined that the visual line of the user does not collide with the viewpoint switching object (step S410/YES), the process returns to step S402. When it is determined that the visual line of the user collides with the viewpoint switching object (step S410/YES), the output control unit 260 zooms in/out the captured image disposed in the virtual space in accordance with movement of the position of the user (step S412). Subsequently, the virtual object control unit 250 determines whether the position of the user moves to the viewpoint switching position (step S414). When it is determined that the position of the user does not move (step S414/NO), the process returns to step S402. When it is determined that the position of the user moves (step S414/YES), the selection unit 270 selects the content ID associated with the viewpoint switching object (step S416). Thus, the content configuration information received in step S402 is switched to the content configuration information of a newly selected content ID, and thus the switching of the viewpoint is realized. Thereafter, the process returns to step S402.

3. Second Embodiment

A second embodiment is a mode in which a spatial interaction in which a tracking target in a captured image disposed in a virtual space is involved is realized by associating three-dimensional position information of the tracking target with the tracking target in the captured image disposed in the virtual space. While the three-dimensional position information is associated with the entire surface of a real object in the first embodiment, three-dimensional position information is associated with one point corresponding to a three-dimensional position of a tracking target among real objects in the second embodiment. For example, three-dimensional position information associated with one point corresponding to a three-dimensional position of a tracking target among real objects is specific coordinates of a predetermined coordinate system corresponding to a three-dimensional position of a real object corresponding to a tracker.

<3.1. Overview>

(1) Overview of Recording Device

Figure 17:
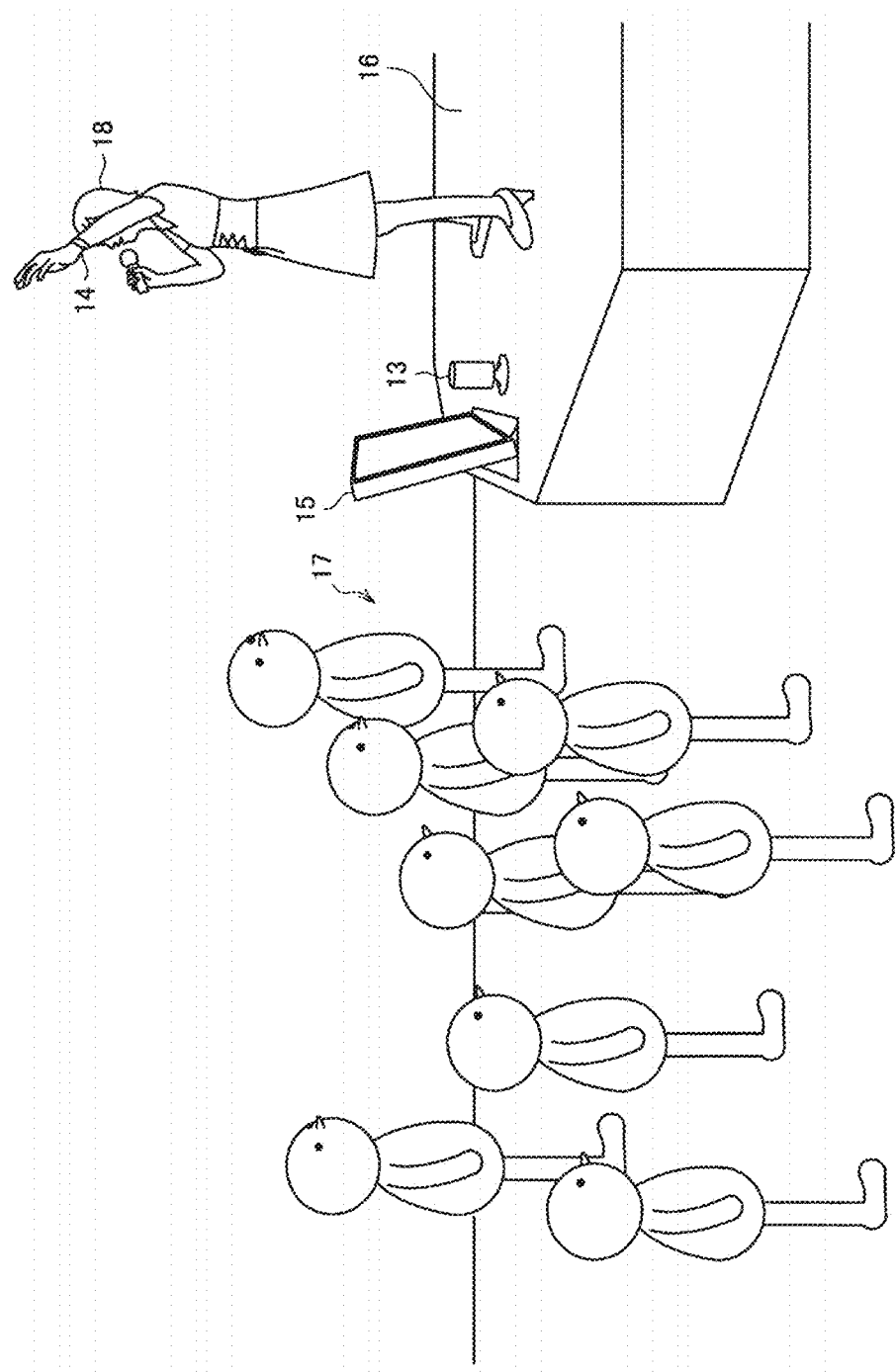
FIG. 17 is a diagram illustrating an overview of a recording device according to a second embodiment.

FIG. 17 is a diagram illustrating an overview of the recording device of the recording device 10 according to a second embodiment. FIG. 17 illustrates an example of a space which is an information recording target of the recording device 10. As illustrated in FIG. 17, the performer 18 wearing a tracker 14 is singing on the stage 16 in front of many spectators in the spectator stand 17 in the present space. In the present space, a third sensor device 13 is installed as a device involved in recording by the recording device 10. In the present space, a monitor 15 is also disposed.

Third Sensor Device 13

The third sensor device 13 is a device that senses the real space. The third sensor device 13 includes an imaging device. The imaging device has been described above with regard to the first sensor device 11.

The third sensor device 13 includes a tracker sensor that detects a position and attitude of a tracking target in the real space. For example, the tracker sensor sets the tracker 14 worn on the wrist of the performer 18 as a tracking target and detects a position and attitude of the tracker 14. In tracking of the tracker sensor, any tracking technology of an optical type, a laser type, or a magnetic type can be used.

Monitor 15

The monitor 15 has been described above in the first embodiment.

The device installed in the recording target space has been described above.

The recording device 10 generates the content configuration information including various kinds of information for configuring VR content on the side of the reproduction device 20 based on a sensing result from the third sensor device 13. Then, the recording device 10 transmits the generated content configuration information to the reproduction device 20.

(2) Overview of Reproduction Device

Figure 18:
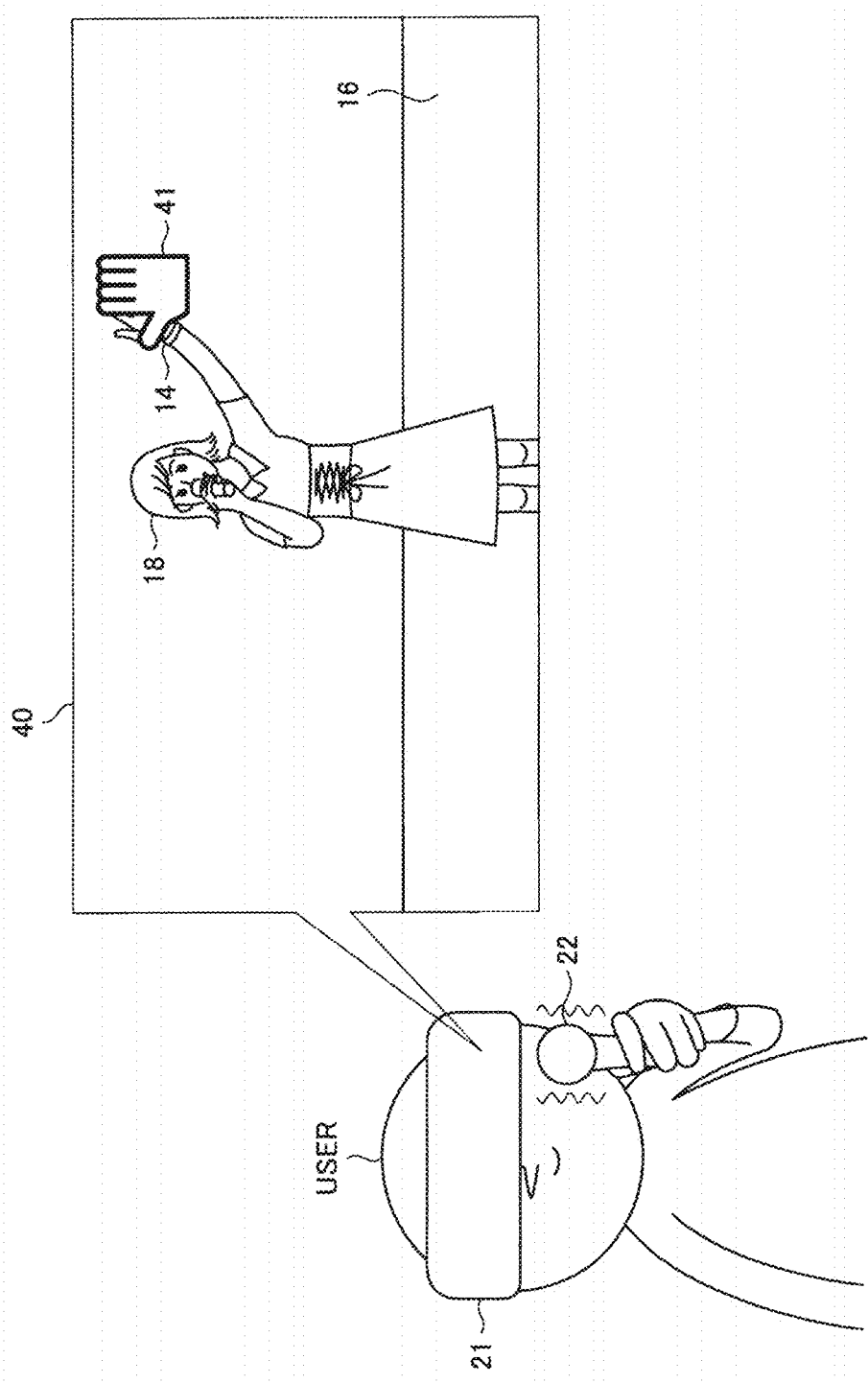
FIG. 18 is a diagram illustrating an overview of a reproduction device according to the second embodiment.

FIG. 18 is a diagram illustrating an overview of the reproduction device 20 according to the second embodiment. FIG. 18 illustrates the HMD 21 and the controller 22 as devices involved in reproduction of VR content by the reproduction device 20. The HMD 21 and the controller 22 have been described above in the first embodiment.

The reproduction device 20 generates VR content based on the content configuration information received from the recording device 10. In the VR content according to the embodiment, a captured image obtained by imaging the real space is disposed in the virtual space as one of the virtual objects. Further, in the VR content according to the embodiment, three-dimensional position information indicating a three-dimensional position of the tracker 14 is associated with the tracker 14 in the captured image disposed in the virtual space. Thus, it is possible to realize the spatial interaction of the tracker 14 which is a real object in the captured image disposed in the virtual space. Hereinafter, this point will be described in detail.

As illustrated in FIG. 18, the HMD 21 displays VR content 40 generated by the reproduction device 20. In the VR content 40, a captured image including the performer 18 wearing the tracker 14 on the stage 16 illustrated in FIG. 17 is disposed in the virtual space and three-dimensional position information is associated with the tracker 14 in the captured image.

When the user operates the controller 22, a position and an attitude of the operator 41 are changed in the virtual space in accordance with a position and an attitude of the controller 22 in the real space. The operator 41 is a virtual object indicating an operation position of the user in the virtual space. The reproduction device 20 determines a collision between the operator 41 and the tracker 14 in the virtual space based on a position of the operator 41 in the virtual space and the three-dimensional position information associated with the tracker 14. When it is determined that the operator 41 collides the tracker 14, the reproduction device 20 causes the controller 22 to output a tactile feedback corresponding to the collision.

In this way, the content delivery system 1 according to the embodiment can realize the spatial interaction in which the tracking target which is the real object in the captured image disposed in the virtual space is involved.

<3.2. Technical Features of Recording Device>

<3.2.1. Functional Configuration Example of Recording Device>

Figure 19:
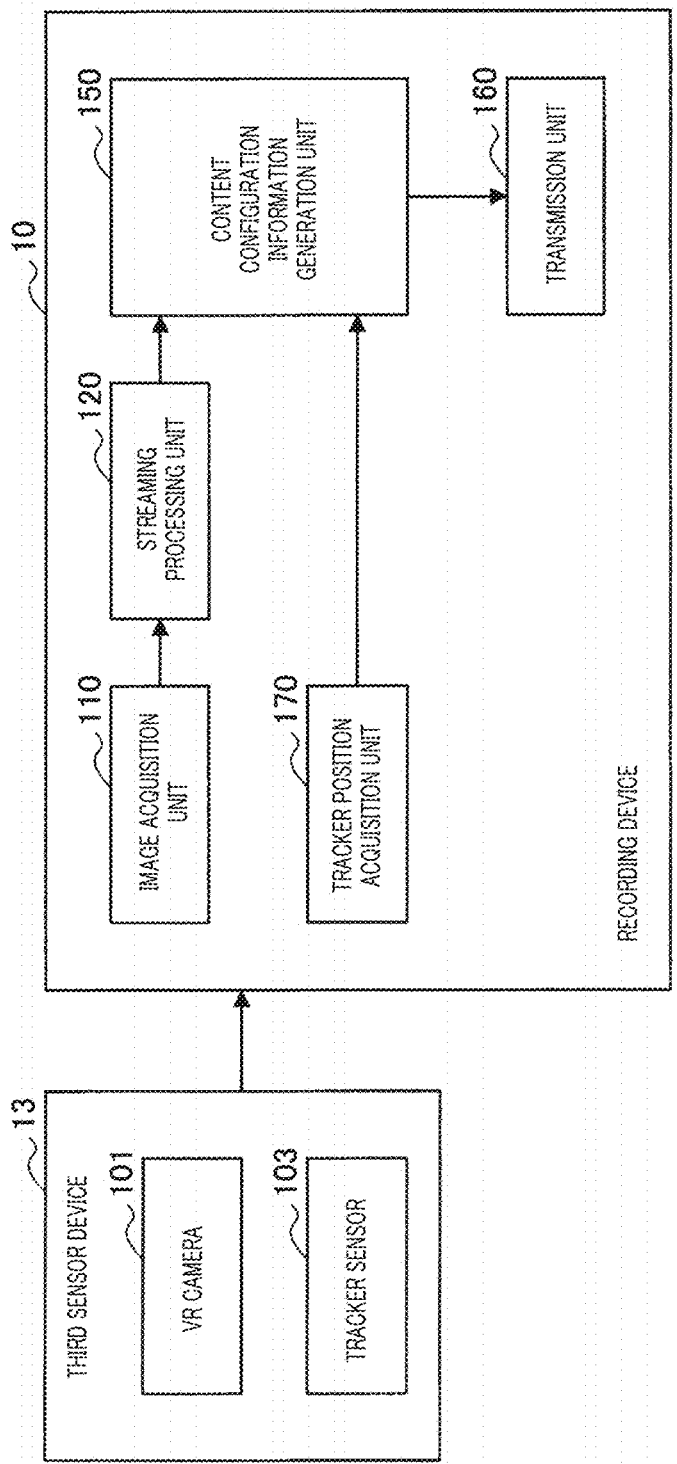
FIG. 19 is a block diagram illustrating an example of a functional configuration of the recording device according to the second embodiment.

FIG. 19 is a block diagram illustrating an example of a functional configuration of the recording device 10 according to the embodiment. As illustrated in FIG. 19, the recording device 10 includes the image acquisition unit 110, the streaming processing unit 120, a tracker position acquisition unit 170, the content configuration information generation unit 150, and the transmission unit 160.

FIG. 19 also illustrates an example of functional configurations of the third sensor device 13. As illustrated in FIG. 19, the third sensor device 13 includes the VR camera 101 and a tracker sensor 103.

Hereinafter, the constituent elements will be described. Description of the same constituent elements as the constituent elements described in the first embodiment will be omitted and differences from those of the first embodiment will be described.

(1) Third Sensor Device 13

The VR camera 101 has been described above in the first embodiment and the tracker sensor 103 has been described above with reference to FIG. 17.

(2) Recording Device 10

(Image Acquisition Unit 110)

The image acquisition unit 110 has been described above in the first embodiment.

(Streaming Processing Unit 120)

The streaming processing unit 120 has been described above in the first embodiment.

(Tracker Position Acquisition Unit 170)

The tracker position acquisition unit 170 has a function of acquiring three-dimensional position information indicating a position of the tracker 14 in the real space from the tracker sensor 103 included in the third sensor device 13. Here, the three-dimensional position information is information which is defined by the origin set based on the position of the tracker sensor 103 and coordinate axes set based on the attitude of the tracker sensor 103 and indicates a position of the tracker sensor 103 in a coordinate system. The three-dimensional position information of the tracker 14 is three-dimensional position information (corresponding to three-dimensional subject position information) of one point of the tracker 14. The tracker position acquisition unit 170 outputs the acquired 3-dimensional position information of the tracker 14 to the content configuration information generation unit 150.

(Content Configuration Information Generation Unit 150)

In the content configuration information generation unit 150, the surface model in the foregoing description of the first embodiment may be replaced with the three-dimensional position information of the tracker 14.

(Transmission Unit 160)

The transmission unit 160 has been described above in the first embodiment.

<3.2.2. Format of Content Configuration Information>

Figure 20:
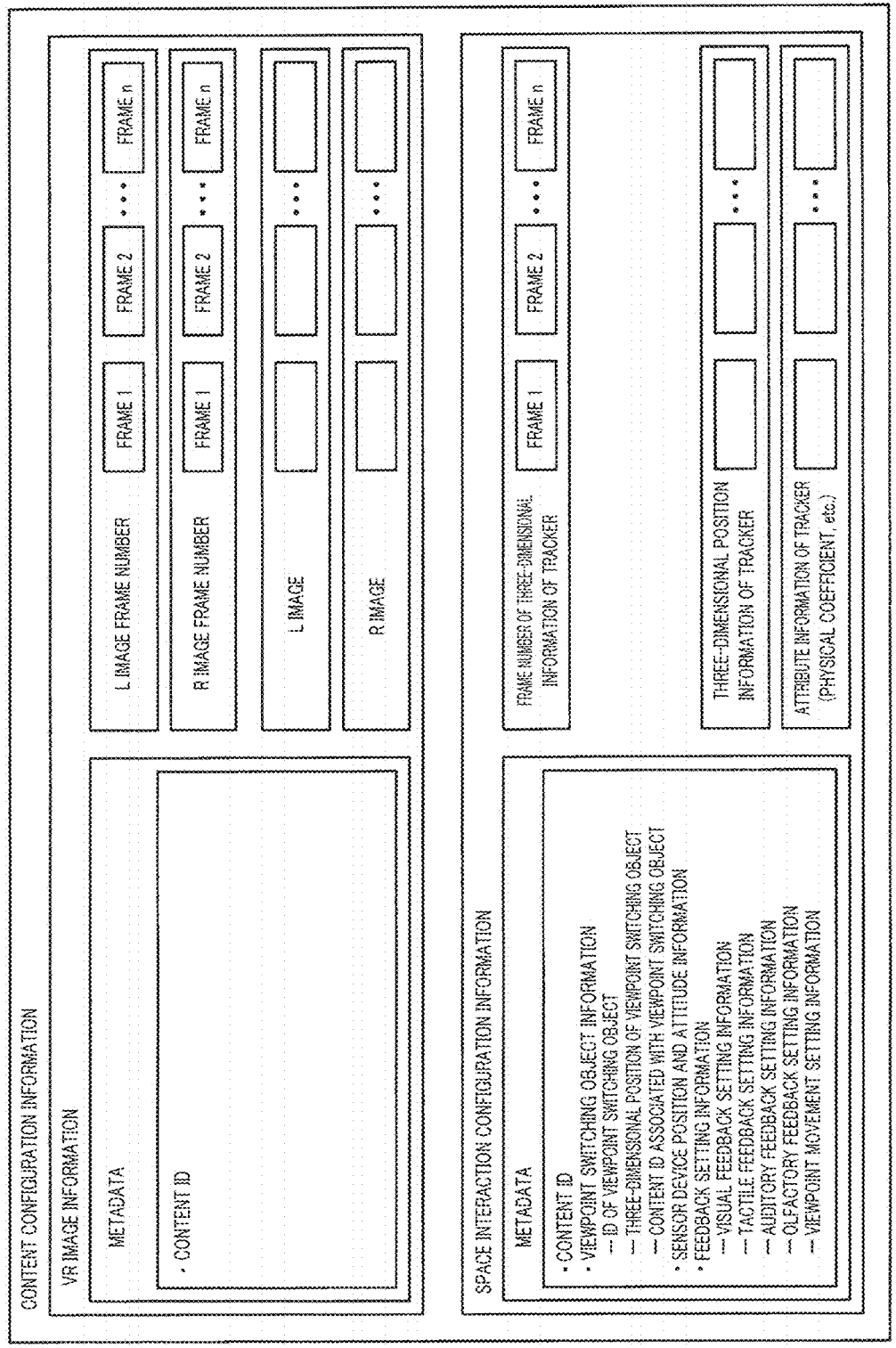
FIG. 20 is a diagram illustrating an example of a format of content configuration information according to the second embodiment.

FIG. 20 is a diagram illustrating an example of a format of the content configuration information according to the second embodiment. As illustrated in FIG. 20, the content configuration information includes VR image information and spatial interaction configuration information. FIG. 20 illustrates a format of the content configuration information in which images of frames with frame numbers 1 to n and the three-dimensional position information of the tracker 14 are containerized.

VR Image Information

The VR image information has been described above in the first embodiment.

Spatial Interaction Configuration Information

The spatial interaction configuration information includes 3-dimensional position information of the tracker 14 for each frame, attribute information of the position and attitude information of the tracker 14, and a frame number. The three-dimensional position information of the tracker 14 for each frame is information indicating the position of the tracker 14 in an image of each frame. The attribute information is information including a physical coefficient of a spatial interaction, such as a reflection coefficient, a frictional coefficient, or a normal direction. The frame number is information corresponding to a detection time of the three-dimensional position information of the tracker 14 and corresponds to the virtual space association information. The frame number of the captured image captured at a certain time preferably matches the frame number of the three-dimensional position information of the tracker 14 detected at the same time. Thus, it is easy to establish timing synchronization between the captured image and the three-dimensional position information of the tracker 14.

The spatial interaction configuration information includes metadata. The metadata includes a content ID, viewpoint switching object information, sensor device position and attitude information, and feedback setting information. The content ID, the viewpoint switching object information, and the feedback setting information have been described above in the first embodiment.

The sensor device position and attitude information according to the embodiment is information regarding a coordinate system of the imaging device capturing the captured image and a coordinate system of the sensor detecting the three-dimensional position information of the tracker 14 and corresponds to the virtual space association information. That is, the sensor device position and attitude information according to the embodiment is information regarding a coordinate system of the VR camera 101 and a coordinate system of the tracker sensor 103. The coordinate system of the tracker sensor 103 is defined by the origin set based on a position of the tracker sensor 103 and coordinate axes set based on an attitude of the tracker sensor 103.

The sensor device position and attitude information may include information indicating the positions and attitudes of the VR camera 101 and tracker sensor 103, which is information for defining the coordinate systems. The sensor device position and attitude information may include information indicating a deviation between the coordinate systems, such as differences between the positions and attitudes of the VR camera 101 and the tracker sensor 103. The sensor device position and attitude information may be set manually based on, for example, installation situations of the VR camera 101 and the tracker sensor 103. The sensor device position and attitude information may be acquired by comparing the position and attitude of the tracker 14 in the captured image with the position and attitude of the tracker 14 detected by the tracker sensor 103 when the tracker 14 is imaged by the VR camera 101 and is sensed by the tracker sensor 103.

Even in the VR camera 101 and the tracker sensor 103 included in the same third sensor device 13, the positions and the attitudes can also deviate. The deviation can result in a deviation between the position and attitude of the tracker 14 in the captured image disposed in the virtual space and the three-dimensional position information of the tracker 14 associated with the tracker 14 at the time of configuration of the VR content on the side of the reproduction device 20. From this point, by including the sensor device position and attitude information in the content configuration information, it is possible to correct the deviation on the side of the reproduction device 20.

Here, when a plurality of trackers 14 is included in the captured image, the spatial interaction configuration information may also include a set of three-dimensional position information, attribute information, and metadata of one point of the tracker 14 for each tracker 14. The spatial interaction configuration information may also include the feedback setting information for each tracker 14. In this case, identification information of the tracker 14 is associated with information of each tracker 14.

The three-dimensional position information of the tracker 14 may be diverted between frames. In this case, the spatial interaction information includes the diverted three-dimensional position information of the tracker 14 and information for identifying a period in which the three-dimensional position information of the tracker 14 is diverted. For example, when there is the tracker 14 which is not moving for a predetermined time, the content configuration information generation unit 150 records the three-dimensional position information of the tracker 14 in association with a starting frame of the predetermined time and records time information regarding the diverting of the three-dimensional position information of the tracker 14 (for example, an ending frame of the predetermined time). Thus, since a transmission amount can be reduced, it is possible to reduce a transmission delay.

<3.2.3. Flow of Recording Process>

Figure 21:
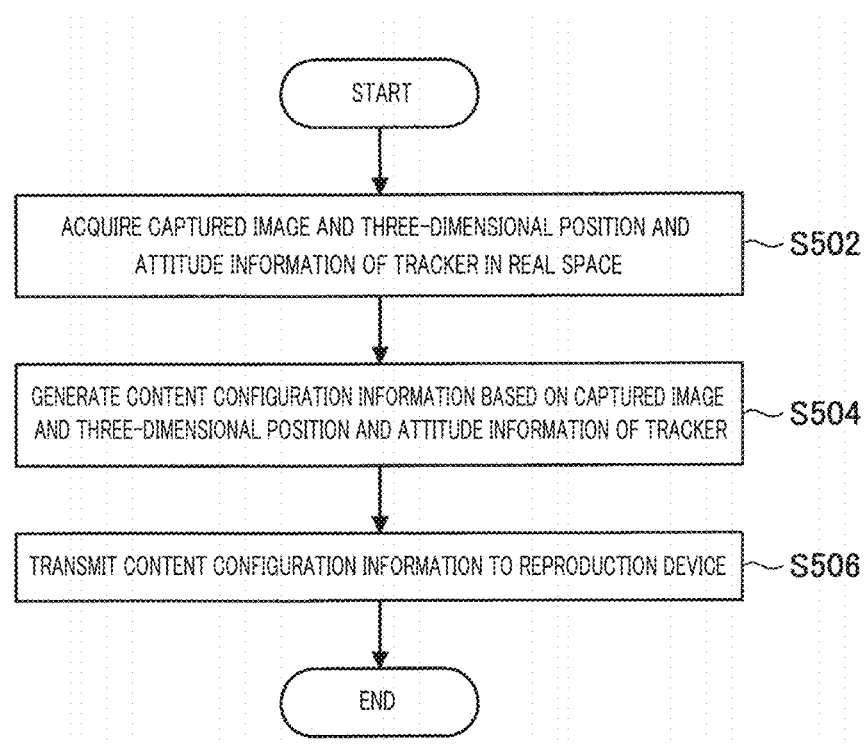
FIG. 21 is a flowchart illustrating an example of a flow of a recording process performed by the recording device according to the second embodiment.

FIG. 21 is a flowchart illustrating an example of a flow of a recording process performed by the recording device 10 according to the embodiment. As illustrated in FIG. 21, the image acquisition unit 110 first acquires a captured image of the real space and the tracker position acquisition unit 170 acquires the three-dimensional position information of the tracker 14 (step S502). Subsequently, the content configuration information generation unit 150 generates the content configuration information based on the captured image and the three-dimensional position information of the tracker 14 (step S504). Thereafter, the transmission unit 160 transmits the content configuration information to the reproduction device 20 (step S506).

<3.3. Technical Features of Reproduction Device>

<3.3.1. Functional Configuration Example of Reproduction Device>

The reproduction device 20 according to the embodiment include similar constituent elements to those illustrated in FIG. 7. In each constituent element, the first sensor device 11 and the second sensor devices 12, the depth sensor 102, the surface model, and the real object in the foregoing description of the first embodiment may be replaced with the third sensor device 13, the tracker sensor 103, the three-dimensional position information of the tracker 14, and the tracker 14, respectively. Other feature points of the embodiment will be described below.

(Output Control Unit 260)

The output control unit 260 overlaps and displays the virtual object on the tracker 14 in the captured image displayed in the virtual space based on the three-dimensional position information of the tracker 14. Thus, even when the performer 18 moves and the tracker 14 thus moves, the virtual object can be concomitant with a movement of the tracker 14.

The output control unit 260 may control the size and/or visibility of the virtual object overlapped on the tracker 14 based on accuracy of the three-dimensional position information of the tracker 14. For example, when the accuracy of the three-dimensional position information of the tracker 14 is low, the output control unit 260 increases the size of the virtual object and/or blurs the virtual object. Thus, even when the accuracy of the three-dimensional position information of the tracker 14 is low and a deviation between the tracker 14 in the VR content and the virtual object overlapped on the tracker 14 occurs, the deviation is inconspicuous. Conversely, when the accuracy of the three-dimensional position information of the tracker 14 is high, the output control unit 260 decreases the size of the virtual object and/or emphasizes the virtual object.

(Selection Unit 270)

The selection unit 270 can select the third sensor device 13 as a selection candidate viewpoint. That is, the selection unit 270 can select the content configuration information generated based on a sensing result from the third sensor device 13 as the content configuration information which is an origin of the VR content to be reproduced.

<3.3.2. Spatial Interaction>

(1) First Spatial Interaction

The first spatial interaction is an interaction between the user and the tracker 14 in the captured image disposed in the virtual space. The interaction has been described above with reference to FIG. 18. Specifically, when the operator 41 operated by the user collides with the tracker 14 in the captured image disposed in the virtual space, the reproduction device 20 causes the controller 22 to output a tactile feedback corresponding to the collision. A flow of a process related to this interaction will be described with reference to FIG. 22.

Figure 22:
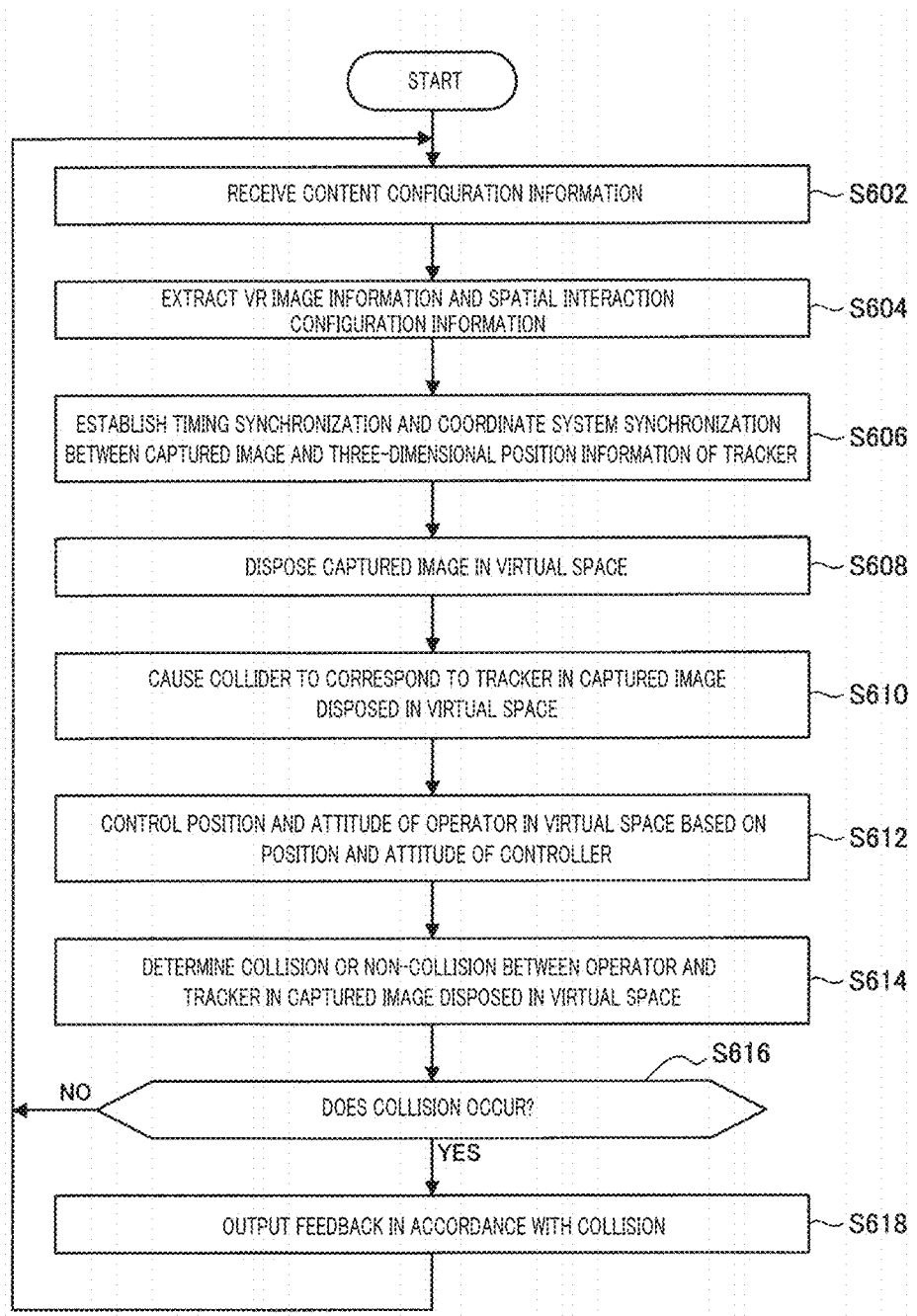
FIG. 22 is a flowchart illustrating an example of a flow of a first spatial interaction process performed by the reproduction device according to the second embodiment.

FIG. 22 is a flowchart illustrating an example of a flow of the first spatial interaction process performed by the reproduction device 20 according to the embodiment. As illustrated in FIG. 22, the reception unit 210 first receives the content configuration information (step S602). Subsequently, the content configuration information analysis unit 220 extracts the VR image information and the spatial interaction configuration information from the content configuration information (step S604). Subsequently, the timing synchronization unit 230 establishes the timing synchronization between the captured image and the three-dimensional position information of the tracker 14 and the coordinate conversion unit 240 establishes the coordinate system synchronization between the captured image and the three-dimensional position information of the tracker 14 (step S606). Subsequently, the output control unit 260 disposes the captured image in the virtual space (step S608).

Next, the virtual object control unit 250 associates the physical coefficient and the collider with the tracker 14 in the captured image disposed in the virtual space (step S610). Subsequently, the virtual object control unit 250 controls the position and attitude of the operator 41 in the virtual space based on the position and attitude of the controller 22 (step S612). Subsequently, the virtual object control unit 250 determines collision or non-collision between the operator 41 and the tracker 14 in the captured image disposed in the virtual space (step S614). Specifically, the virtual object control unit 250 determines collision or non-collision between the collider associated with the operator 41 and the collider associated with the tracker 14 in the captured image disposed in the virtual space. When the collision is determined not to arise (step S616/NO), the process returns to step S602. When the collision is determined to arise (step S616/YES), the output control unit 260 outputs a feedback in accordance with the collision (step S618). Specifically, the output control unit 260 controls the output of the visual/tactile/auditory/olfactory feedback to the user based on the physical coefficient and the feedback setting information associated with the tracker 14. Thereafter, the process returns to step S602.

(2) Second Spatial Interaction

The second spatial interaction is an interaction between the user and the real object associated with the tracker 14 in the captured image disposed in the virtual space. This interaction will be described in detail with reference to FIG. 23.

Figure 23:
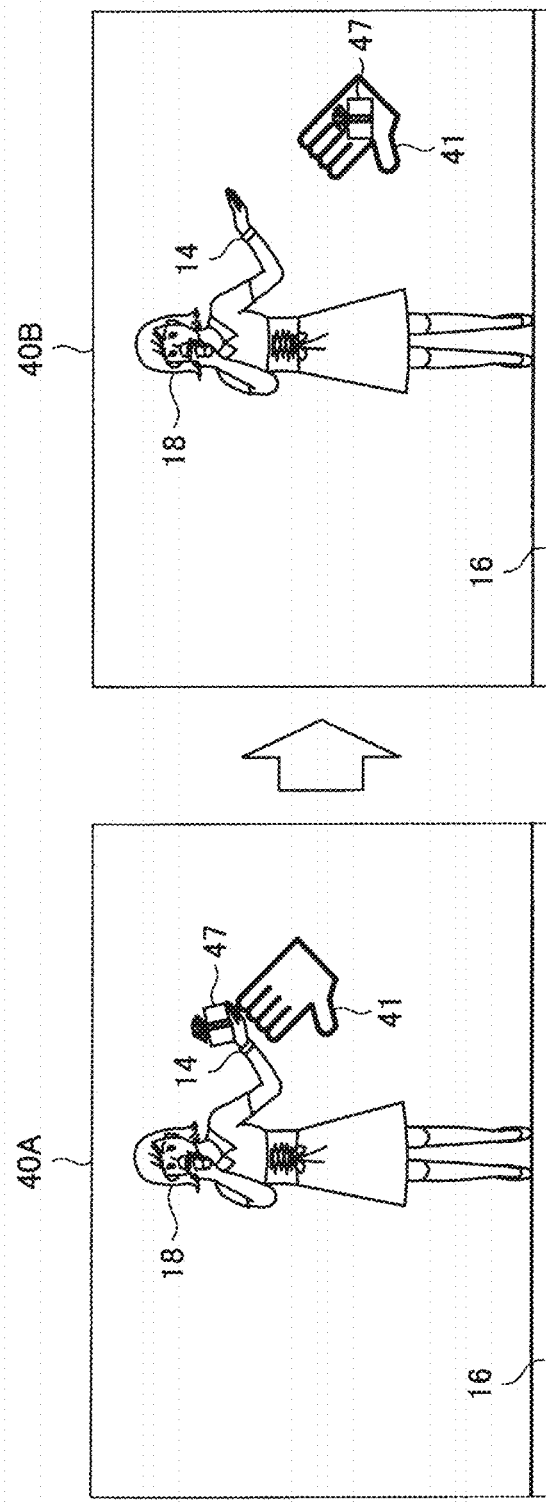
FIG. 23 is a diagram illustrating an example of a second spatial interaction according to the second embodiment.

FIG. 23 is a diagram illustrating an example of the second spatial interaction according to the embodiment. In the VR content 40A illustrated in FIG. 23, a captured image including the performer 18 wearing the tracker 14 on the stage 16 illustrated in FIG. 2 is disposed in the virtual space, and the three-dimensional position information is associated with the tracker 14 in the captured image. The output control unit 260 disposes a giftbox 47 which is a virtual object to overlap at a three-dimensional position of the real object corresponding to the three-dimensional position of the tracker 14 based on the three-dimensional position information of the tracker 14. For example, in the example illustrated in FIG. 23, the output control unit 260 disposes the giftbox 47 at the position of the palm of the performer wearing the tracker 14. Therefore, the virtual object control unit 250 first determines to add the three-dimensional position information of the real object corresponding to the tracker 14 as predetermined offset information to the three-dimensional position information of the tracker 14. For example, the output control unit 260 uses a difference between the position and attitude of the wrist which is a worn position of the tracker 14 and the position and attitude of the palm with respect to the wrist as the position offset information. Then, the virtual object control unit 250 associates a collider with the three-dimensional position of the real object corresponding to the tracker 14. Thus, it is possible to dispose the virtual object on the palm of the party wearing the tracker 14 and determine a collision. Even when the performer 18 moves and the tracker 14 thus moves, the giftbox 47 is concomitant with a movement of the tracker 14. The user can perform a receiving operation at the position of the giftbox 47 through the controller 22 in conjunction with the operator 41. When the receiving operation is performed, the giftbox 47 becomes a child object of the operator 41 and the operator 41 becomes a parent object of the ball 43. Therefore, as indicated in the VR content 40B, the giftbox 47 is moved concomitantly with the operator 41. In this way, an exchanging interaction of the giftbox 47 between the user and the performer 18 in the captured image disposed in the virtual space is realized. A flow of a process related to the interaction will be described with reference to FIG. 24.

Figure 24:
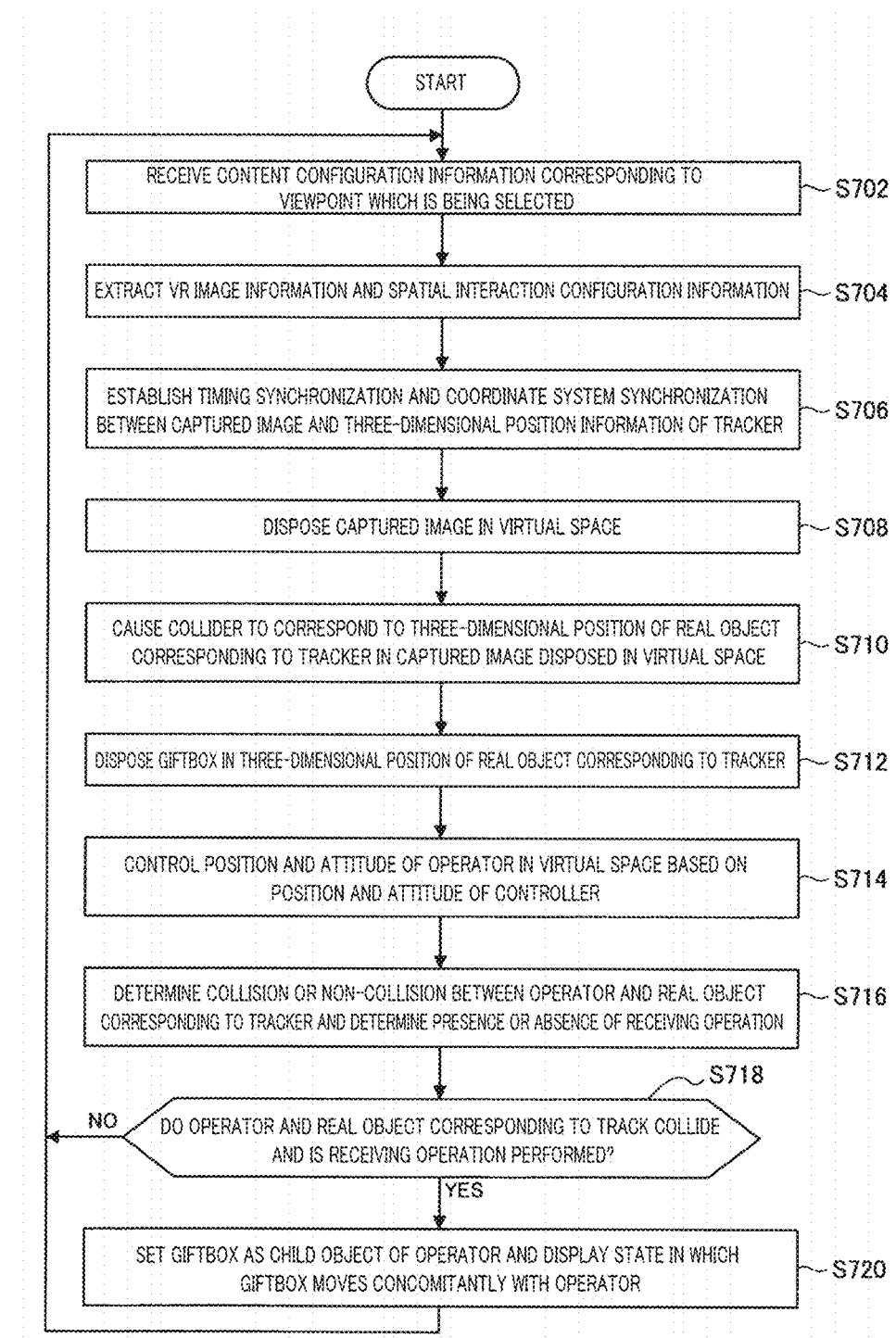
FIG. 24 is a flowchart illustrating an example of a flow of the second spatial interaction process performed by the reproduction device according to the second embodiment.

FIG. 24 is a flowchart illustrating an example of a flow of the second spatial interaction process performed by the reproduction device 20 according to the second embodiment. The process of steps S702 to S708 illustrated in FIG. 24 is similar to the process of steps S602 to S608 illustrated in FIG. 22. Thereafter, the virtual object control unit 250 associates the physical coefficient and the collider with the three-dimensional position of the real object (for example, the palm) corresponding to the tracker 14 using the position offset information as described above (step S710). Subsequently, the output control unit 260 disposes the giftbox 47 at the three-dimensional position of the real object corresponding to the tracker 14 in the captured image disposed in the virtual space (step S712). Subsequently, the virtual object control unit 250 controls the position and attitude of the operator 41 in the virtual space based on the position and attitude of the controller 22 (step S714).

Thereafter, the virtual object control unit 250 determines collision or non-collision between the operator 41 and the real object corresponding to the tracker 14 and presence or absence of the receiving operation (step S716). Specifically, the virtual object control unit 250 determines collision or non-collision between the collider associated with the real object (for example, a palm) corresponding to the tracker 14 in the captured image disposed in the virtual space and the collider associated with the operator 41 and determines whether the receiving operation is input. When the collision is determined not to arise and the receiving operation is determined not to be performed (step S718/NO), the process returns to step S702. When the collision is determined to arise and the receiving operation is determined to be performed (step S718/YES), the output control unit 260 sets the giftbox 47 as the child object of the operator 41 and displays an aspect in which the giftbox 47 is moved concomitantly with the operator 41 (step S720). At this time, the output control unit 260 may control the output of the visual/tactile/auditory/olfactory feedback to the user based on the physical coefficient and the feedback setting information associated with the tracker 14. Thereafter, the process returns to step S702.

4. Supplement (1) Recording Side

When the sensing of the first sensor device 11 or the second sensor device 12 fails or the sensing is stopped, the recording device 10 may predict a sensing result or interpolate the sensing result using an immediately previous sensing result. The recording device 10 may generate the content configuration information by combining the depth sensor 102 and the tracker sensor 103. That is, the first and second embodiments may be combined. For example, the content configuration information generated by the recording device 10 may include both the surface model data and the three-dimensional position information of the tracker.

(2) Reproduction Side

The reproduction device 20 may adjust an operation amount by the operator 41 in accordance with a user. For example, the reproduction device 20 adjusts a relation between a change amount of the position of the controller 22 in the real space and a change amount of the position of the operator 41 in the virtual space in accordance with the length of a hand of the user. Specifically, for a user who has a short hand, the reproduction device 20 considerably moves the operator 41 with a slight movement of the controller 22. In addition, the reproduction device 20 may approach the operator 41 to an operation target spontaneously.

(3) Offset Process

As described in the foregoing second embodiment, when the real object corresponding to the tracker 14 is a spatial interaction target, the 3-dimensional position information of the real object corresponding to the tracker 14 is acquired using position offset information. This process is also referred to as an offset process.

The position offset information which is used in the offset process and indicates a relation between positions and attitudes of the tracker 14 and the real object corresponding to the tracker 14 may be acquired by the side of the recording device 10 or may be acquired by the side of the reproduction device 20. When the position offset information is acquired by the side of the recording device 10, the content configuration information generation unit 150 may include and record the position offset information and the three-dimensional position information of the tracker 14 acquired by the tracker position acquisition unit 170 in the content configuration information. That is, the content configuration information includes the position offset information and the three-dimensional position information of the tracker 14. The reproduction device 20 acquires the three-dimensional position information of the real object corresponding to the tracker 14 based on the position offset information and the three-dimensional position information of the tracker 14 included in the received content configuration information.

In the second embodiment, the example in which the recording device 10 does not perform the offset process and the reproduction device 20 performs the offset process has been described. However, the present technology is not limited to this example. For example, the recording device 10 may perform the offset process and the reproduction device 20 does not perform the offset process. In this case, the content configuration information generation unit 150 acquires the three-dimensional position information of the real object corresponding to the tracker 14 by adding the position offset information to the three-dimensional position information of the tracker 14 acquired by the tracker position acquisition unit 170. The content configuration information generation unit 150 includes and records this three-dimensional position information in the content configuration information. That is, the content configuration information includes the three-dimensional position information of the real object corresponding to the tracker 14.

The reproduction device 20 associates the collider with the three-dimensional position of the real object corresponding to the tracker 14 based on the received content configuration information.

5. Hardware Configuration Example

Finally, a hardware configuration of the information processing device according to an embodiment will be described with reference to FIG. 25. FIG. 25 is a block diagram illustrating an example of a hardware configuration of an information processing device according to the embodiment. An information processing device 900 illustrated in FIG. 25 can realize, for example, the recording device 10 or the reproduction device 20 illustrated in FIGS. 4, 7, and 19. Information processing by the recording device 10 or the reproduction device 20 according to the embodiment is realized by cooperation of software and hardware to be described below.

As illustrated in FIG. 25, the information processing device 900 includes a central processing unit (CPU) 901, a read-only memory (ROM) 902, a random access memory (RAM) 903, and a host bus 904a. The information processing device 900 includes a bridge 904, an external bus 904b, an interface 905, an input device 906, an output device 907, a storage device 908, a drive 909, a connection port 911, and a communication device 913. The information processing device 900 may include a processing circuit such as an electric circuit, a DSP, or an ASIC instead of or in addition to the CPU 901.

The CPU 901 functions as an arithmetic processing device and a control device and controls general operations in the information processing device 900 in accordance with various programs. The CPU 901 may be a microprocessor. The ROM 902 stores programs, arithmetic parameters, and the like used by the CPU 901. The RAM 903 temporarily stores programs used in execution of the CPU 901 and parameters or the like appropriately changed in the execution. The CPU 901 can function as, for example, the image acquisition unit 110, the streaming processing unit 120, the depth information acquisition unit 130, the surface model acquisition unit 140, the content configuration information generation unit 150, and the tracker position acquisition unit 170 illustrated in FIG. 4 or 19. The CPU 901 can function as, for example, the content configuration information analysis unit 220, the timing synchronization unit 230, the coordinate conversion unit 240, the virtual object control unit 250, the output control unit 260, and the selection unit 270 illustrated in FIG. 7.

The CPU 901, the ROM 902, and the RAM 903 are connected to each other by a host bus 904a including a CPU bus. The host bus 904a is connected to an external bus 904b such as a peripheral component interconnect/interface (PCI) bus via the bridge 904. The host bus 904a, the bridge 904, and the external bus 904b are not necessarily be separated from each other and these functions may be mounted on one bus.

The input device 906 is realized by, for example, a device such as a mouse, a keyboard, a touch panel, a button, a microphone, a switch, and a lever to which information is input by a user. The input device 906 may be, for example, a remote control device using infrared light or other radio waves or may be an externally connected device such as a mobile phone or a PDA corresponding to an operation of the information processing device 900. Further, the input device 906 may include, for example, an input control circuit that generates an input signal based on information input by the user using the input means and outputs the input signal to the CPU 901. The user of the information processing device 900 can operate the input device 906 to input various kinds of data to the information processing device 900 or give a processing operation instruction.

The output device 907 is formed by a device capable of notifying a user of acquired information visually or auditorily. As this device, there is a display device such as a CRT display device, a liquid crystal display device, a plasma display device, an EL display device, a laser projector, an LED projector, and a lamp, a sound output device such as a speaker and a headphone, or a printer device. The output device 907 outputs, for example, results obtained through various processes performed by the information processing device 900. Specifically, the display device displays the results obtained through various processes performed by the information processing device 900 in various forms such as text, images, tables, and graphs visually. On the other hand, the sound output device converts an audio signal formed by reproduced sound data or acoustic data into an analog signal and outputs the analog signal auditorily.

The storage device 908 is a data storage device formed as an example of a storage unit of the information processing device 900. The storage device 908 is realized by, for example, a magnetic storage device such as an HDD, a semiconductor storage device, an optical storage device, or a magneto-optical storage device. The storage device 908 may include a storage medium, a recording device that records data on the storage medium, a reading device that reads data from the storage device, and a deletion device that deletes data recorded on the storage medium. The storage device 908 stores various kinds of data and programs executed by the CPU 901 and various kinds of pieces of data acquired from the outside.

The drive 909 is a storage medium reader or writer and is embedded or attached externally to the information processing device 900. The drive 909 reads information recorded on a mounted removable storage medium such as a magnetic disk, an optical disc, a magneto-optical disk, or a semiconductor memory and outputs the information to the RAM 903. The drive 909 can write information on the removable storage medium.

The connection port 911 is an interface connected to an external device and is, for example, a connection port to the external device capable of transmitting data through a universal serial bus (USB).

The communication device 913 is, for example, a communication interface formed by a communication device or the like and connected to the network 920. The communication device 913 is, for example, a communication card for a wired or wireless local area network (LAN), a Long Term Evolution (LTE), Bluetooth (registered trademark), or wireless USB (WUSB). The communication device 913 may be a router for optical communication, a router for asymmetric digital subscriber line (ADSL), or a modem for various types of communication. For example, the communication device 913 can transmit and receive a signal or the like to and from the Internet or another communication device in conformity with a predetermined protocol such as TCP/IP. The communication device 913 can function as, for example, the transmission unit 160 illustrated in FIG. 4 or 19. The communication device 913 can function as, for example, the reception unit 210 illustrated in FIG. 7.

The network 920 is a wired or wireless transmission path for information transmitted from a device connected to the network 920. For example, the network 920 may include a public line network such as the Internet, a telephone line network, or a satellite communication network, various local area networks (LANs) including Ethernet (registered trademark), and a wide area network (WAN). The network 920 may include a dedicated line network such as Internet protocol-virtual private network (IP-VPN).

The example of the hardware configuration capable of realizing the functions of the information processing device 900 according to the embodiment has been described above. The constituent elements may be realized using general-purpose members or may be realized by hardware specialized for the function of each constituent element. Accordingly, it is possible to appropriately change a hardware configuration to be used in accordance with a technical level when the embodiment is carried out.

It is possible to produce and mount a computer program for realizing each function of the information processing device 900 according to the above-described embodiment on a PC or the like. It is possible to also provide a computer-readable recording medium in which the computer program is stored. The recording medium is, for example, a magnetic disk, an optical disc, a magneto-optical disk, or a flash memory. The computer program may be delivered via, for example, a network without using the recording medium.

6. Conclusion

The embodiments of the present disclosure have been described above in detail with reference to FIGS. 1 to 25. As described above, the recording device 10 according to the embodiment acquires a captured image including a real object and three-dimensional position information of the real object. The recording device 10 generates content configuration information including the captured image, the three-dimensional position information of the real object, and virtual space association information which is information used for an interaction in which the real object in the captured image displayed in the virtual space is involved and is information for associating the real object in the captured image with the three-dimensional position information of the real object. Thus, the reproduction device 20 can associate the three-dimensional position information with the real object in the captured image while disposing the captured image in the virtual space. The reproduction device 20 can realize the spatial interaction between the real object in the captured image displayed in the virtual space and another virtual object by referring to the three-dimensional position information. Specifically, the reproduction device 20 can detect a collision based on the three-dimensional position information of the real object in the captured image displayed in the virtual space and the three-dimensional position information of the other virtual object and output a feedback in accordance with the collision. In this way, it is possible to realize the spatial interaction in photographic VR content more appropriately.

The preferred embodiment of the present disclosure has been described above in detail with reference to the appended figures, but the technical range of the present disclosure is not limited to the example. It is apparent to those skilled in the art in the technical field of the present disclosure that various changes or corrections can be made within the scope of the technical spirit and essence described in the claims and these changes and corrections are, of course, construed to pertain to the technical scope of the present disclosure.

The processes described with reference to the flowchart and the sequence figures in the present specification may not necessarily be performed in the orders illustrating in the figures. Several processing steps may be performed in parallel. Additional processing steps may be adopted or some processing steps may be omitted.

The advantageous effects described in the present specification are merely explanatory or exemplary and are not limited. That is, in the technology according to the present disclosure, other advantageous effects apparent to those skilled in the art can be obtained from the description of the present specification in addition to or instead of the foregoing advantageous effects.

The following configurations belong to the technical scope of the present disclosure.

(1)

An information processing device including:

an acquisition unit configured to acquire a captured image including a subject and three-dimensional subject position information indicating a three-dimensional position of the subject; and a content configuration information generation unit configured to generate content configuration information including the captured image, the three-dimensional subject position information, and virtual space association information which is information used for an interaction in which the subject in the captured image displayed in the virtual space is involved and is information for associating the subject in the captured image with the three-dimensional subject position information.

(2)

The information processing device described in (1), in which the virtual space association information includes identification information for associating the captured image with the three-dimensional subject position information.

(3)

The information processing device described in (1) or (2), in which the virtual space association information includes information regarding a coordinate system of an imaging device capturing the captured image and a coordinate system of a sensor detecting the three-dimensional subject position information.

(4)

The information processing device described in any one of (1) to (3), in which the virtual space association information includes information corresponding to an imaging time of the captured image and information corresponding to a detection time of the three-dimensional subject position information.

(5)

The information processing device described in any one of (1) to (4), in which the content configuration information further includes feedback setting information for setting feedback content when an interaction in which the subject in the captured image displayed in the virtual space is involved is performed.

(6)

The information processing device described in (5), in which the feedback setting information includes information for setting content fed back visually, tactually, auditorily, or olfactorily.

(7)

The information processing device described in (5) or (6), in which the feedback setting information includes information for setting content fed back at the time of viewpoint movement in the virtual space.

(8)

The information processing device described in any one of (1) to (7), in which the content configuration information includes information indicating a physical coefficient of the subject.

(9)

The information processing device described in any one of (1) to (8), in which the three-dimensional subject position information is three-dimensional position information of a plurality of points on a surface of the subject.

(10)

The information processing device described in (9), in which the three-dimensional subject position information is three-dimensional position information of a plurality of points of the subject satisfying a predetermined condition on the surface.

(11)

The information processing device described in (9) or (10), in which the three-dimensional subject position information is three-dimensional position information of the number of points in accordance with a transmission speed of the content configuration information.

(12)

The information processing device described in any one of (1) to (11), in which the three-dimensional subject position information is three-dimensional position information of one point of a tracking target.

(13)

An information processing device including:

an acquisition unit configured to acquire content configuration information including a captured image including a subject, three-dimensional subject position information indicating a three-dimensional position of the subject, and virtual space association information which is information used for an interaction in which the subject in the captured image displayed in the virtual space is involved and is information for associating the subject in the captured image with the three-dimensional subject position information; and an output control unit configured to display the captured image in the virtual space based on the content configuration information and control a feedback output corresponding to an interaction in which the subject in the captured image displayed in the virtual space is involved.

(14)

The information processing device described in (13), in which the virtual space association information includes identification information for associating the captured image with the three-dimensional subject position information.

(15)

The information processing device described in (13) or (14), in which the virtual space association information includes information regarding a coordinate system of an imaging device capturing the captured image and a coordinate system of a sensor detecting the three-dimensional subject position information.

(16)

The information processing device described in any one of (13) to (15), in which the virtual space association information includes information corresponding to an imaging time of the captured image and information corresponding to a detection time of the three-dimensional subject position information.

(17)

The information processing device described in any one of (13) to (16), in which the content configuration information further includes feedback setting information for setting feedback content when an interaction in which the subject in the captured image displayed in the virtual space is involved is performed.

(18)

The information processing device described in any one of (13) to (17), in which the content configuration information includes information indicating a physical coefficient of the subject.

(19)

The information processing device described in any one of (13) to (18), further including a coordinate conversion unit configured to apply a coordinate conversion process of correcting a deviation between a coordinate system of an imaging device capturing the captured image and a coordinate system of a sensor detecting the three-dimensional subject position information to the three-dimensional subject position information.

(20)

The information processing device described in any one of (13) to (19), further including a timing synchronization unit configured to establish timing synchronization between the captured image and the three-dimensional subject position information.

(21)

The information processing device described in any one of (13) to (20), in which the output control unit controls a feedback output corresponding to a collision between the subject in the captured image displayed in the virtual space and another virtual object.

(22)

The information processing device described in (21), in which the output control unit controls a tactile feedback output indicating a collision when the subject in the captured image displayed in the virtual space collides with a virtual object indicating an operation position of a user in the virtual space.

(23)

The information processing device described in (21) or (22), further including a collision detection unit configured to detect a collision between the subject in the captured image displayed in the virtual space and the other virtual object based on the three-dimensional subject position information and three-dimensional position information of the other virtual object.

(24)

The information processing device described in any one of (13) to (23), in which the output control unit overlaps a virtual object on the subject in the captured image displayed in the virtual space based on the three-dimensional subject position information.

(25)

The information processing device described in (24), in which the output control unit controls a size and/or visibility of the virtual object overlapped on the subject based on accuracy of the three-dimensional subject position information.

(26)

The information processing device described in any one of (13) to (25), further including a selection unit configured to select the content configuration information corresponding to a position of a user in the virtual space as the content configuration information to be acquired by the acquisition unit.

(27)

The information processing device described in (26), in which the selection unit switches the content configuration information selected using arrival of the position of the user in the virtual space at a predetermined position as a trigger.

(28)

The information processing device described in (27), in which the predetermined position is a position, in the virtual space, corresponding to a position of an imaging device capturing the captured image which is an origin of the content configuration information of a switching destination.

(29)

The information processing device described in (27), in which a distance between the predetermined position and a predetermined real object in the captured image displayed in the virtual space is the same as a distance between the predetermined real object and a position, in the virtual space, corresponding to a position of an imaging device capturing the captured image which is an origin of the content configuration information of a switching destination.

(30)

The information processing device described in any one of (27) to (29), in which the output control unit disposes the captured image in the virtual space so that a predetermined real object in the captured image displayed in the virtual space collides with a visual line of the user after switching by the selection unit.

(31)

The information processing device described in (27) or (30), in which the output control unit moves the position of the user when a visual line of the user in the virtual space collides a predetermined virtual object.

(32)

An information processing method performed by a processor, the method including:

acquiring a captured image including a subject and three-dimensional subject position information indicating a three-dimensional position of the subject; and generating content configuration information including the captured image, the three-dimensional subject position information, and virtual space association information which is information used for an interaction in which the subject in the captured image displayed in the virtual space is involved and is information for associating the subject in the captured image with the three-dimensional subject position information.

(33)

An information processing method performed by a processor, the method including:

acquiring content configuration information including a captured image including a subject, three-dimensional subject position information indicating a three-dimensional position of the subject, and virtual space association information which is information used for an interaction in which the subject in the captured image displayed in the virtual space is involved and is information for associating the subject in the captured image with the three-dimensional subject position information; and displaying the captured image in the virtual space based on the content configuration information and controlling a feedback output corresponding to an interaction in which the subject in the captured image displayed in the virtual space is involved.

(34)

A program causing a computer to function as:

an acquisition unit configured to acquire a captured image including a subject and three-dimensional subject position information indicating a three-dimensional position of the subject; and a content configuration information generation unit configured to generate content configuration information including the captured image, the three-dimensional subject position information, and virtual space association information which is information used for an interaction in which the subject in the captured image displayed in the virtual space is involved and is information for associating the subject in the captured image with the three-dimensional subject position information.

(35)

A program causing a computer to function as:

an acquisition unit configured to acquire content configuration information including a captured image including a subject, three-dimensional subject position information indicating a three-dimensional position of the subject, and virtual space association information which is information used for an interaction in which the subject in the captured image displayed in the virtual space is involved and is information for associating the subject in the captured image with the three-dimensional subject position information; and an output control unit configured to display the captured image in the virtual space based on the content configuration information and control a feedback output corresponding to an interaction in which the subject in the captured image displayed in the virtual space is involved.

REFERENCE SIGNS LIST

1 Content delivery system
10 Recording device
110 Image acquisition unit
120 Streaming processing unit
130 Depth information acquisition unit
140 Surface model acquisition unit
150 Content configuration information generation unit
160 Transmission unit
170 Tracker position acquisition unit
11 First sensor device
12 Second sensor device
13 Third sensor device
101 VR camera
102 Depth sensor
103 Tracker sensor
14 Tracker
15 Monitor
16 Stage
17 Spectator stand
18 Performer
19 Viewpoint switching position
20 Reproduction device
210 Reception unit
220 Content configuration information analysis unit
230 Timing synchronization unit
240 Coordinate conversion unit
250 Virtual object control unit
260 Output control unit
270 Selection unit
22 Controller
201 Display unit
202 Position and attitude detection unit
203 Sound output unit
204 Sound input unit
205 Position and attitude detection unit
206 Vibration output unit

The invention claimed is:

1. An information processing device comprising:
circuitry configured to acquire a captured image including a subject and three-dimensional subject position information indicating a three-dimensional position of the subject; and generate content configuration information including the captured image, the three-dimensional subject position information, and virtual space association information which is information used for an interaction in which the subject in the captured image displayed in the virtual space is involved and is information for associating the subject in the captured image with the three-dimensional subject position information, wherein the content configuration information further includes feedback setting information for setting feedback content when an interaction in which the subject in the captured image displayed in the virtual space is performed, the feedback setting information including information for setting content fed back at the time of viewpoint movement in the virtual space.

2. The information processing device according to claim 1, wherein the virtual space association information includes identification information for associating the captured image with the three-dimensional subject position information.

3. The information processing device according to claim 1, wherein the virtual space association information includes information regarding a coordinate system of a camera capturing the captured image and a coordinate system of a sensor detecting the three-dimensional subject position information.

4. The information processing device according to claim 1, wherein the virtual space association information includes information corresponding to an imaging time of the captured image and information corresponding to a detection time of the three-dimensional subject position information.

5. The information processing device according to claim 1, wherein the feedback setting information includes information for setting content fed back visually, tactually, auditorily, or olfactorily.

6. The information processing device according to claim 1, wherein the content configuration information includes information indicating a physical coefficient of the subject.

7. The information processing device according to claim 1, wherein the three-dimensional subject position information is three-dimensional position information of a plurality of points on a surface of the subject.

8. The information processing device according to claim 7, wherein the three-dimensional subject position information is three-dimensional position information of a plurality of points of the subject satisfying a predetermined condition on the surface.

9. The information processing device according to claim 7, wherein the three-dimensional subject position information is three-dimensional position information of the number of points in accordance with a transmission speed of the content configuration information.

10. The information processing device according to claim 1, wherein the three-dimensional subject position information is three-dimensional position information of one point of a tracking target.

11. An information processing device comprising:
circuitry configured to
acquire content configuration information including a captured image including a subject, three-dimensional subject position information indicating a three-dimensional position of the subject, and virtual space association information which is information used for an interaction in which the subject in the captured image displayed in the virtual space is involved and is information for associating the subject in the captured image with the three-dimensional subject position information; and display the captured image in the virtual space based on the content configuration information and control a feedback output corresponding to an interaction in which the subject in the captured image displayed in the virtual space is involved, wherein the virtual space association information includes information regarding a coordinate system of a camera capturing the captured image and a coordinate system of a sensor detecting the three-dimensional subject position information, the coordinate system of the camera being based on a position of the camera and coordinate axes set based on an attitude of the camera and the coordinate system of the sensor being based on a position of the sensor and coordinate axes set based on an attitude of the sensor, the circuitry being configured to convert data detected by the sensor into the coordinate system of the camera.

12. The information processing device according to claim 11, wherein the virtual space association information includes identification information for associating the captured image with the three-dimensional subject position information.

13. The information processing device according to claim 11, wherein the virtual space association information includes information corresponding to an imaging time of the captured image and information corresponding to a detection time of the three-dimensional subject position information.

14. The information processing device according to claim 11, wherein the content configuration information further includes feedback setting information for setting feedback content when an interaction in which the subject in the captured image displayed in the virtual space is involved is performed.

15. The information processing device according to claim 11, wherein the content configuration information includes information indicating a physical coefficient of the subject.

16. The information processing device according to claim 14, wherein the feedback setting information including information for setting content fed back at the time of viewpoint movement in the virtual space.

17. The information processing device according to claim 11, wherein the circuitry is further configured to select the content configuration information corresponding to a position of a user in the virtual space as the content configuration information to be acquired.

18. The information processing device according to claim 17, wherein the circuitry is configured to switch the content configuration information selected using arrival of the position of the user in the virtual space at a predetermined position as a trigger.

19. An information processing method performed by a processor, the method comprising:
acquiring a captured image including a subject and three-dimensional subject position information indicating a three-dimensional position of the subject; and
generating content configuration information including the captured image, the three-dimensional subject position information, and virtual space association information which is information used for an interaction in which the subject in the captured image displayed in the virtual space is involved and is information for associating the subject in the captured image with the three-dimensional subject position information, wherein the content configuration information further includes feedback setting information for setting feedback content when an interaction in which the subject in the captured image displayed in the virtual space is performed, the feedback setting information including information for setting content fed back at the time of viewpoint movement in the virtual space.

\* \* \* \* \*